(12) United States Patent
Saito et al.

(10) Patent No.: US 8,204,837 B2
(45) Date of Patent: Jun. 19, 2012

(54) INFORMATION PROCESSING APPARATUS AND METHOD, AND PROGRAM FOR PROVIDING INFORMATION SUITABLE FOR A PREDETERMINED MOOD OF A USER

(75) Inventors: Mari Saito, Tokyo (JP); Takaomi Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 769 days.

(21) Appl. No.: 11/817,748

(22) PCT Filed: Jan. 5, 2007

(86) PCT No.: PCT/JP2007/050014
§ 371 (c)(1),
(2), (4) Date: Mar. 12, 2009

(87) PCT Pub. No.: WO2007/077991
PCT Pub. Date: Jul. 12, 2007

(65) Prior Publication Data
US 2009/0216692 A1 Aug. 27, 2009

(30) Foreign Application Priority Data
Jan. 6, 2006 (JP) ................................ 2006-001042

(51) Int. Cl.
*G06F 15/18* (2006.01)
(52) U.S. Cl. ........................................................ 706/12
(58) Field of Classification Search .................. None
See application file for complete search history.

(56) References Cited

U.S. PATENT DOCUMENTS

| | | | |
|---|---|---|---|
| 2002/0107852 A1* | 8/2002 | Oblinger | 707/5 |
| 2005/0076093 A1 | 4/2005 | Michelitsch et al. | |
| 2005/0182626 A1* | 8/2005 | Kim et al. | 704/245 |
| 2005/0211071 A1 | 9/2005 | Lu et al. | |
| 2006/0248091 A1 | 11/2006 | Yamamoto et al. | |

FOREIGN PATENT DOCUMENTS

JP 2002-7433 1/2002

(Continued)

OTHER PUBLICATIONS

Chen et al. "Facial expression recognition: A clustering-based approach", Pattern Recognition Letters 24, 2003, pp. 1295-1302.*

(Continued)

*Primary Examiner* — Jeffrey A Gaffin
*Assistant Examiner* — Li-Wu Chang
(74) *Attorney, Agent, or Firm* — Finnegan, Henderson, Farabow, Garrett & Dunner, L.L.P.

(57) ABSTRACT

The invention relates to an information processing apparatus and method and a program which can provide an item suitable for a feeling (mood) of a user. A user data acquisition section acquires a result of decision by the user regarding whether or not an item is appropriate to a predetermined mood. An inappropriateness filter production section acquires a characteristic amount of an item decided as not being appropriate to the predetermined mood by all of users from a characteristic amount analysis section. The inappropriateness filter production section analyzes a plurality of characteristic amounts of different acquired items to extract a characteristic amount of an item which is not appropriate to the predetermined mood. An inappropriateness filter produced by the inappropriateness filter production section is used when it is decided whether or not a predetermined item is appropriate to a predetermined mood.

10 Claims, 24 Drawing Sheets

FOREIGN PATENT DOCUMENTS

| | | |
|---|---|---|
| JP | 2002-304401 | 10/2002 |
| JP | 2003-288439 | 10/2003 |
| JP | 2005-284406 | 10/2005 |
| JR | 2004-194107 | 7/2004 |
| WO | WO 2004-109544 | 12/2004 |

OTHER PUBLICATIONS

Gygi et al. "Spectral-temporal factors in the identification of environmental sounds", J. Acoust. Soc. Am. 115 (3), 2004, pp. 1252-1265.*

Hiroaki Matsuura et al., "Server Side SPAM Mail Detection System, Based on SPAM Database", The IEICE Transactions on Communications (Japanese Edition), vol. J88-B, No. 10, pp. 1934-1943, Chapter 2.3, 2005.

Ulas Bager et al., "Boosting Classifiers for Music Genre Classification", Computer and information Science, 2005 Lecture Notes in Computer Science, Springer, Berlin, DE, vol. 3733, Jan. 1, 2005, pp. 575-584.

Tao Li et al., "Content-Based Music Similarity Search and Emotion Detection", Proc. 2004, IEEE Int. Conf. of Acoustics, Speech and Signal Processing, vol. 5, May 17, 2004, pp. 705-708, Montreal, Que., Canada.

J. Stephen Downie et al., "Real-Time Genre Classification for Music Digital Libraries", Proceedings of the 5the ACM/IEEE Joint Conference on Digital Libraries.Jun. 7-11, 2005, Denver, Colorado.

* cited by examiner

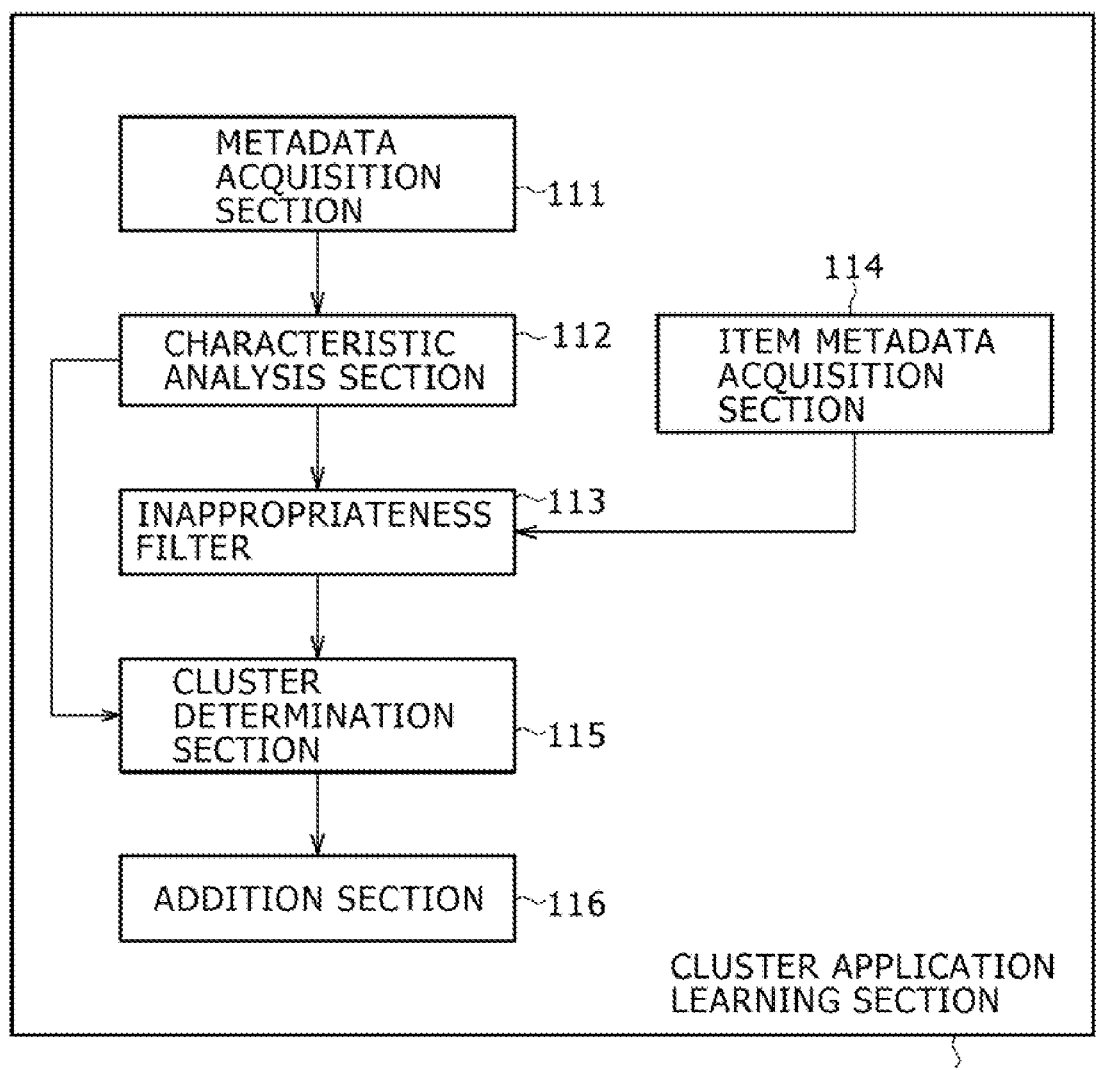

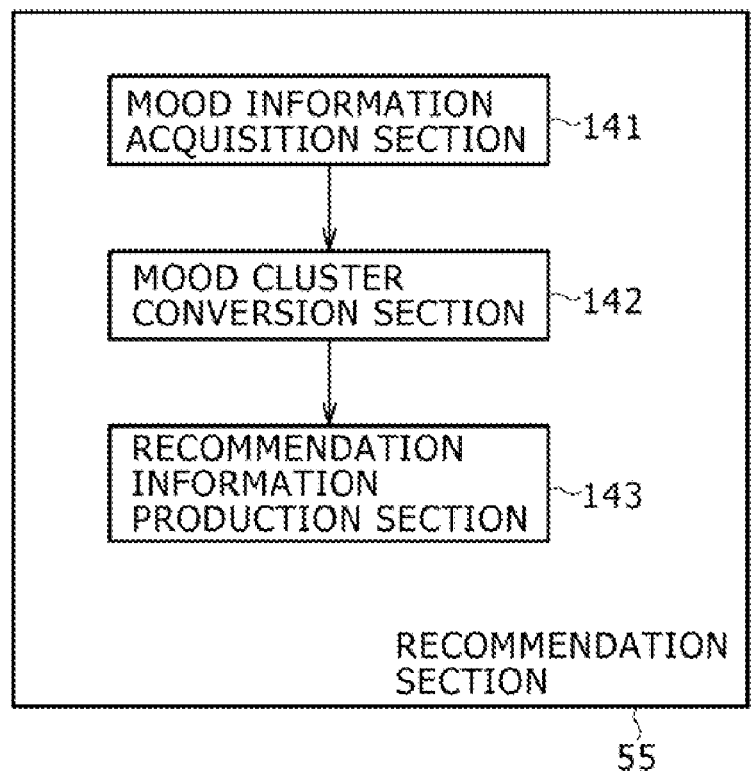

FIG. 9

| ITEM NO. | GENRE | ARTIST | TEMPO | HARMONY | CLUSTER | SUB CLUSTER |
|---|---|---|---|---|---|---|
| 1-001 | Rock | ABC | 24 | A | 1 | 2 |
| 1-002 | J-Pop | GGG | 89 | B | 1 | 3 |
| .. | | | | | | |

172

|  | DEMENSION 1 | DEMENSION 2 | DEMENSION 3 | ... |
|---|---|---|---|---|
| MUSICAL PEICE 1 | 0.12 | 0.34 | 0.62 | |
| MUSICAL PEICE 2 | 0.24 | 0.42 | 0.14 | |
| MUSICAL PEICE 3 | 0.23 | 0.03 | 0.09 | |
| 173 — ... | | | | |

FIG.18

| SAD | MUSIC PEACE 1 | MUSIC PEACE 2 | MUSIC PEACE 3 | MUSIC PEACE 4 | MUSIC PEACE 5 | MUSIC PEACE 6 |
|---|---|---|---|---|---|---|
| USER A | ○ | ○ | ○ | × | × | × |
| USER B | × | ○ | ○ | × | × | × |
| USER C | ○ | ○ | × | × | ○ | × |
| USER D | ○ | ○ | ○ | × | × | × |
| USER E | ○ | ○ | × | ○ | × | ○ |
| ○ TOTAL NUMBER | 4 | 5 | 3 | 1 | 1 | 1 |
| ○ RATIO | 0.80 | 1.00 | 0.60 | 0.20 | 0.20 | 0.20 |

| SUB CLUSTER 3 | | | |
|---|---|---|---|
| MUSICAL PIECE 4 | MUSICAL PIECE 5 | MUSICAL PIECE 6 | |
| 0.20 | 0.20 | 0.20 | |

| SUB CLUSTER 6 | | |
|---|---|---|
| MUSICAL PIECE 1 | MUSICAL PIECE 2 | |
| 0.80 | 1.00 | |

FIG. 23

| | METHOD X | METHOD Y | METHOD Z |
|---|---|---|---|
| MUSICAL PIECE 1 | SUB CLUSTER 1 | SUB CLUSTER 1 | SUB CLUSTER 1 |
| MUSICAL PIECE 2 | SUB CLUSTER 1 | SUB CLUSTER 1 | SUB CLUSTER 1 |
| MUSICAL PIECE 3 | SUB CLUSTER 2 | SUB CLUSTER 1 | SUB CLUSTER 1 |
| MUSICAL PIECE 4 | SUB CLUSTER 3 | SUB CLUSTER 2 | SUB CLUSTER 2 |
| MUSICAL PIECE 5 | SUB CLUSTER 3 | SUB CLUSTER 3 | SUB CLUSTER 2 |
| MUSICAL PIECE 6 | SUB CLUSTER 3 | SUB CLUSTER 2 | SUB CLUSTER 2 |

FIG. 24

| | METHOD X | METHOD Y | METHOD Z |
|---|---|---|---|
| SUB CLUSTER 1 | 0.90 | 0.80 | 0.80 |
| SUB CLUSTER 2 | 0.60 | 0.20 | 0.20 |
| SUB CLUSTER 3 | 0.20 | 0.20 | |

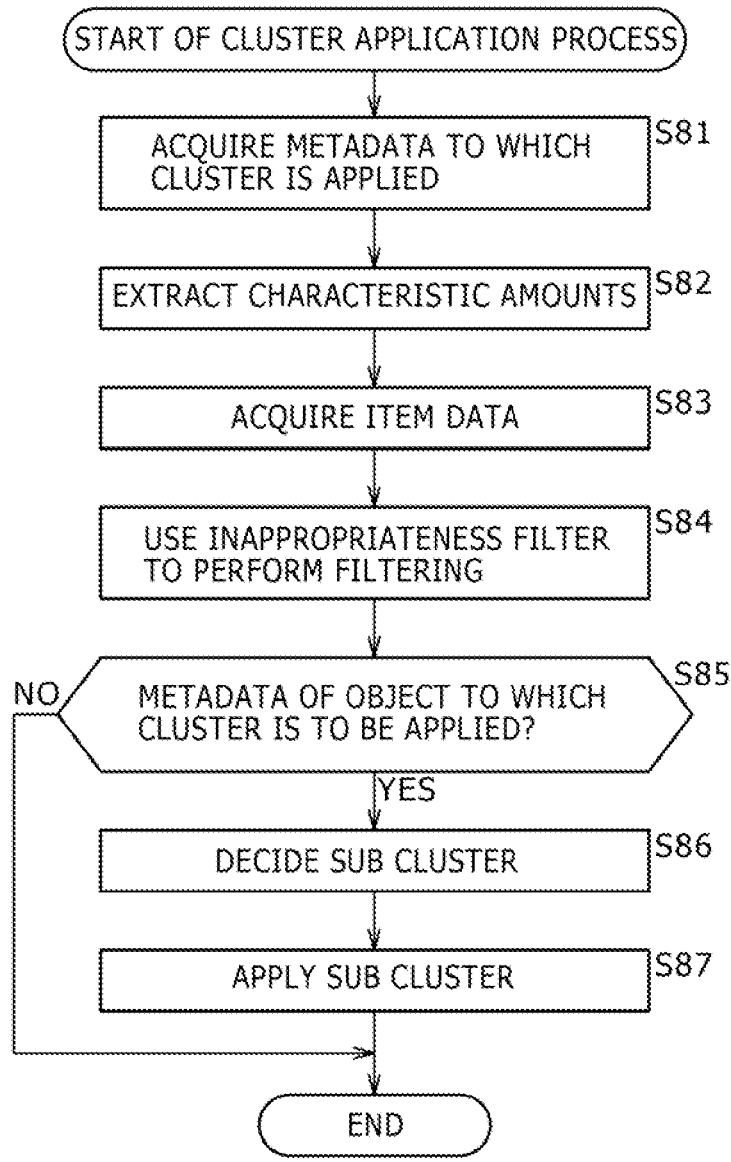

INFORMATION PROCESSING APPARATUS AND METHOD, AND PROGRAM FOR PROVIDING INFORMATION SUITABLE FOR A PREDETERMINED MOOD OF A USER

TECHNICAL FIELD

This invention relates to an information processing apparatus and method and a program, and more particularly to an information processing apparatus and method and a program which can provide information suitable for a feeling of a user.

BACKGROUND ART

Conventionally, inventions for searching and recommending a content such as a television program or a piece of music based on a liking of a client (so-called content personalization) have been proposed (for example, refer to Patent Document 1). For the content personalization, a method called cooperative filtering (CF) and a method called content based filtering (CBF) are used widely.

Also a service of providing a piece of music conforming to the feeling of a user to the user has been proposed. For example, a system as been proposed wherein, if a request for a piece of music which a user wants to enjoy when the user is happy is issued, then a piece of music which is decided as being happy is selected and provided to the user.

[Patent Document 1] Japanese Patent Laid-Open No. 2004-194107

DISCLOSURE OF THE INVENTION

Problems to be Solved by the Invention

In such a case that a piece of music conforming to the feeling (mood) of a user is to be provided, it is necessary to apply, to each of pieces of music to be provided, information of in what mood the piece of music should be provided in advance. Such information is applied by a person with an exclusive contract or by a volunteer through a network or the like.

Since such information is applied manually, there are such problems that a high cost is required for application of information and that much time is required. Further, where application of information relies upon any other than a person with an exclusive contract such as a volunteer, such volunteers may not necessarily apply information accurately, and therefore, there is a problem also that the accuracy is low.

Where information is applied not manually (is applied in accordance with a program or using an apparatus for exclusive use), characteristics of a piece of music are analyzed and information is applied in response to a result of the analysis. However, it is difficult to adequately describe an image which differs among different people, and only information like the greatest common divisor can be applied. Such problems as described above may possibly occur not only where information is applied to a piece of music but also similarly where information is applied to some item.

The present invention has been made in view of such a situation as described above and makes it possible to provide information more adequately conforming to a mood.

Means for Solving the Problems

According to one aspect of the present invention, there is provided an information processing apparatus including an acquisition section configured to acquire information which indicates whether or not a predetermined item is appropriate to a predetermined mood, an extraction section configured to analyze the information acquired by the acquisition section to extract a characteristic amount of an item which is decided as not being appropriate to the predetermined mood, a first learning section configured to analyze the information acquired by the acquisition section to learn a cluster corresponding to the mood and a plurality of sub clusters corresponding to the cluster, a second learning section configured to learn a characteristic of each mood using the item to which the cluster and the sub clusters learned by the first learning section are applied, a decision section configured to decide whether or not a characteristic amount of an item to which a cluster is not applied coincides with the characteristic amount extracted by the extraction section, and an application section configured to apply a cluster and sub clusters to the item decided as not being coincident by the decision section based on the characteristic learned by the second learning section.

The information acquired by the acquisition section may be information regarding a result of questionnaire performed for the user.

The information processing apparatus may be configured such that the first learning section performs multivariate analysis of the information acquired by the acquisition section to quantize the information into several-dimensional data, and performs clustering of the information quantized in the several-dimensional data to learn the sub clusters.

The information processing apparatus may be configured such that the first learning section performs multivariate analysis of a characteristic amount of the item which is not determined as an object from which the characteristic amount is to be extracted by the extraction section to quantize the characteristic amount into several-dimensional data, and performs clustering of the characteristic amount quantized in the several-dimensional data to learn the sub clusters.

The information processing apparatus may be configured such that the first learning section includes a re-editing section configured to re-edit the sub clusters, and the re-editing section deletes, where the number of items included in a predetermined sub cluster is less than a predetermined threshold value, the sub cluster.

The information processing apparatus may be configured such that, where the number of items included in the predetermined sub cluster is less than the predetermined threshold value and a value calculated based on a decided ratio of the number of items appropriate to the predetermined mood from among the items included in the predetermined sub cluster is equal to or greater than a predetermined threshold value, the re-editing section merges the predetermined sub cluster into a different sub cluster.

The information processing apparatus may further include a selection section configured to select one method from among a plurality of clustering methods used when the sub cluster is learned by the first learning section, the selection section selecting a method which exhibits the most dispersed state of the sub clusters based on results where clustering is performed using the plural clustering methods.

The information processing apparatus may further include a conversion section configured to convert information regarding a mood indicated by the information into a cluster associated with the mood, and a recommendation section configured to recommend an item to which the cluster converted by the conversion section is allocated, the recommendation section recommending, where an instruction to recommend a second item other than a first item recommended by the recommendation section, the second item to which a sub cluster different from that of the first item is applied.

According the one aspect of the present invention, there is provided an information processing method including an acquisition step of acquiring information which indicates whether or not a predetermined item is appropriate to a predetermined mood, an extraction step of analyzing the information acquired by the process at the acquisition step to extract a characteristic amount of an item which is decided as not being appropriate to the predetermined mood, a first learning step of analyzing the information acquired by the process at the acquisition step to learn a cluster corresponding to the mood and a plurality of sub clusters corresponding to the cluster, a second learning step of learning a characteristic of each mood using the item to which the cluster and sub clusters learned by the process at the first learning step are applied, a decision step of deciding whether or not a characteristic amount of an item to which a cluster is not applied coincides with the characteristic amount extracted by the process at the extraction step, and an application step of applying a cluster and sub clusters to the item decided as not being coincident by the process at the decision step based on the characteristic learned by the process at the second learning step.

According the one aspect of the present invention, there is provided a program for causing a computer to execute an acquisition step of acquiring information which indicates whether or not a predetermined item is appropriate to a predetermined mood, an extraction step of analyzing the information acquired by the process at the acquisition step to extract a characteristic amount of an item which is decided as not being appropriate to the predetermined mood, a first learning step of analyzing the information acquired by the process at the acquisition step to learn a cluster corresponding to the mood and a plurality of sub clusters corresponding to the cluster, a second learning step of learning a characteristic of each mood using the item to which the cluster and sub clusters learned by the process at the first learning step are applied, a decision step of deciding whether or not a characteristic amount of an item to which a cluster is not applied coincides with the characteristic amount extracted by the process at the extraction step, and an application step of applying a cluster and sub clusters to the item decided as not being coincident by the process at the decision step based on the characteristic learned by the process at the second learning step.

In the information processing apparatus and method and the program according to the one aspect of the present invention, an item is classified in response to a feeling or a state of mind of a user. A result of the classification is used to perform classification of an item which is not classified. Further, an item appropriate to the feeling or state of mind of the user is provided to the user based on the result of the classification.

Effect of the Invention

According to the one aspect of the present invention, an item suitable for a mood of a user can be provided to the user.

BRIEF DESCRIPTION OF THE DRAWINGS

FIG. 6 is a view showing an example of a configuration of a cluster application learning section.
FIG. 7 is a view showing an example of a configuration of a recommendation section.
FIG. 8 is a view illustrating a questionnaire management table.
FIG. 9 is a view illustrating metadata.
FIG. 18 is a view illustrating information used for calculation of an approval rating.
FIG. 19 is a view illustrating information used for calculation of the approval rating.
FIG. 23 is a view illustrating information used for selection of a method for clustering.
FIG. 24 is a view illustrating approval ratings of different methods.
FIG. 25 is a flow chart illustrating a cluster application process.
FIG. 26 is a view illustrating a mood-cluster conversion table.

DESCRIPTION OF REFERENCE SYMBOLS 1 network, 2 server, 3 terminal, 21 CPU, 22 ROM, 23 RAM, 28 storage section, 31 removable medium, 51 learning section, 52 cluster learning section, 53 cluster application learning section, 54 database, 55 recommendation section, 71 music data acquisition section, 72 user data acquisition section, 73 characteristic amount analysis section, 74 inappropriateness filter production section, 75 multivariate analysis section, 76 clustering section, 81 metadata analysis section, 111 metadata acquisition section, 112 characteristic analysis section, 113 inappropriateness filter, 114 item metadata acquisition section, 115 cluster determination section, addition section, 141 mood information acquisition section, 142 mood-cluster conversion section, 143 recommendation information production section, 201 item number decision section, 202 processing object decision section, 203 approval rating calculation section, 204 merging object decision section, 205 merging destination determination section, 206 sub cluster re-setting section

BEST MODE FOR CARRYING OUT THE INVENTION

In the following, an embodiment of the present invention is described with reference to the drawings.

[Configuration of the System]

Figure 1:
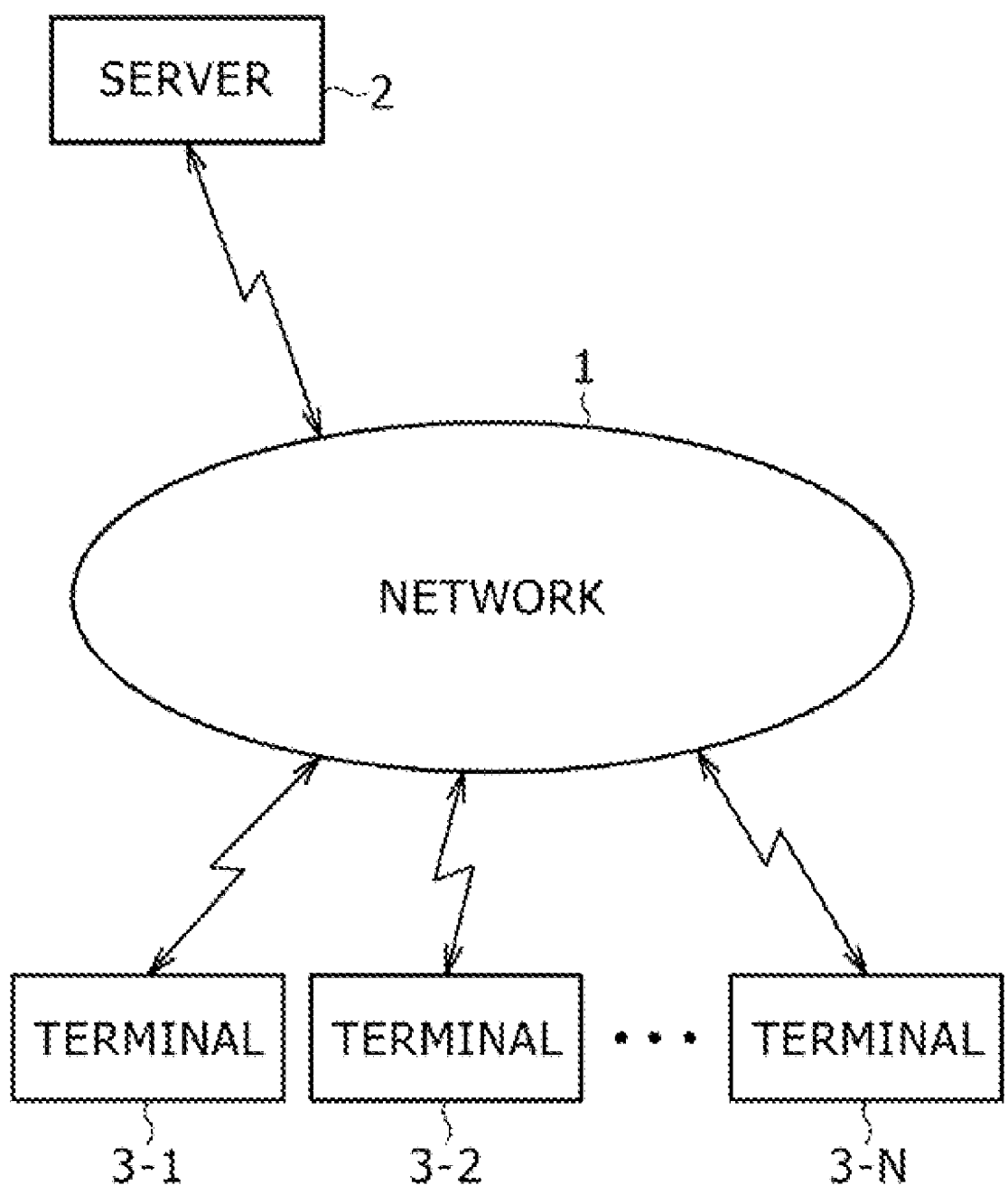
FIG. 1 is a view showing a configuration of an embodiment of a system to which the present invention is applied.

FIG. 1 is a view showing a configuration of an embodiment of a system to which the present invention is applied. A server 2 and terminals 3-1 to 3-N are connected to a network 1. The system shown in FIG. 1 recommends predetermined information (items such as, for example, pieces of music, programs and commodities) to users. Also an analysis for producing information for recommendation and so forth are carried out. The network 1 is formed from the Internet, a LAN (Local Area Network) or the like.

The server 2 stores information for recommendation and produces information to be recommended. The terminals 3-1 to 3-N are terminals of the user side. For example, the terminal 3-1 is operated by a user thereof when the user purchases or listens to a predetermined item before purchasing it. Meanwhile, an item is supplied from the server 2 through the network 1.

In the following description, where there is no necessity to distinguish the terminals 3-1 to 3-N individually, each of them is referred to merely as terminal 3. Further, although only one server 2 is shown in FIG. 1, naturally a plurality of such servers 2 may be provided.

[Configuration and Operation of the Server]

Figure 2:
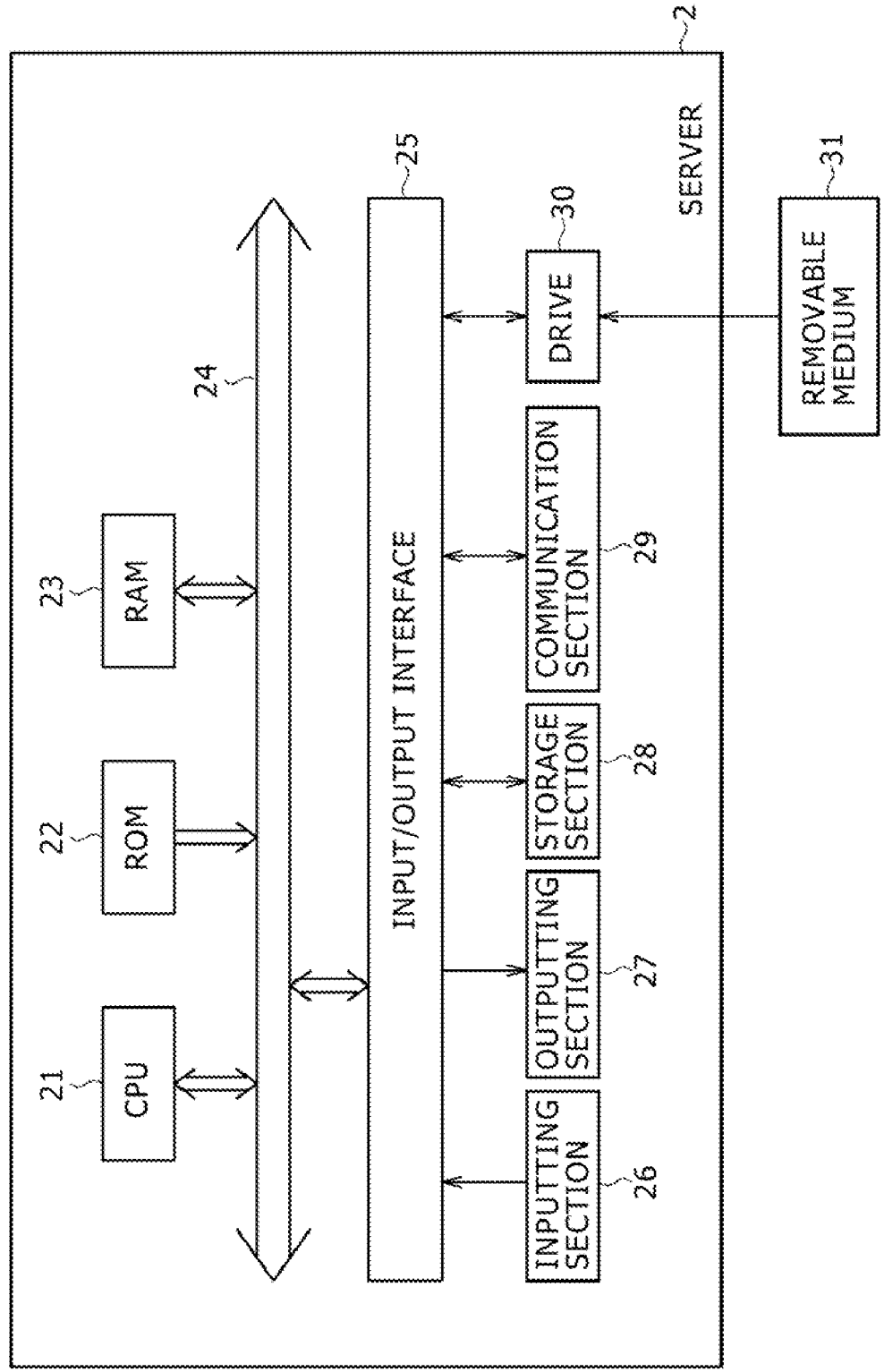
FIG. 2 is a view showing an example of a configuration of a server.

FIG. 2 is a view showing an example of an internal configuration of the server 2. A CPU (Central Processing Unit) 21 executes various processes in accordance with programs stored in a ROM (Read Only Memory) 22 or a storage section 28. Into a RAM (Random Access Memory) 23, a program to be executed by the CPU 21, data and so forth are stored suitably. The CPU 21, ROM 22 and RAM 23 are connected to each other by a bus 24.

Also an input/output interface 25 is connected to the CPU 21 through the bus 24. To the input/output interface 25, an inputting section 26 including a keyboard, a mouse, a microphone and so forth and an outputting section 207 including a display unit, a speaker and so forth are connected. The CPU 21 executes various processes in accordance with an instruction inputted from the inputting section 26. Then, the CPU 21 outputs a result of the processes to the outputting section 27.

The storage section 28 connected to the input/output interface 25 is formed, for example, from a hard disk and so forth and stores programs to be executed by the CPU 21 and various data. A communication section 29 communicates with an external apparatus (for example, a terminal 3) through the network 1. Further, a program may be acquired through the communication section 29 and stored into the storage section 28.

A drive 30 connected to the input/output interface 25 drives, when a removable medium 31 such as a magnetic disk, an optical disk, a magneto-optical disk or a semiconductor memory is loaded therein, the removable medium 31 to acquire a program, data and so forth recorded on the removable medium 31. The acquired program or data is transferred to and stored into the storage section 28 as occasion demands.

The terminal 3 can be formed in a configuration basically similar to that of the server 2, and therefore, description of this is omitted here.

Figure 3:
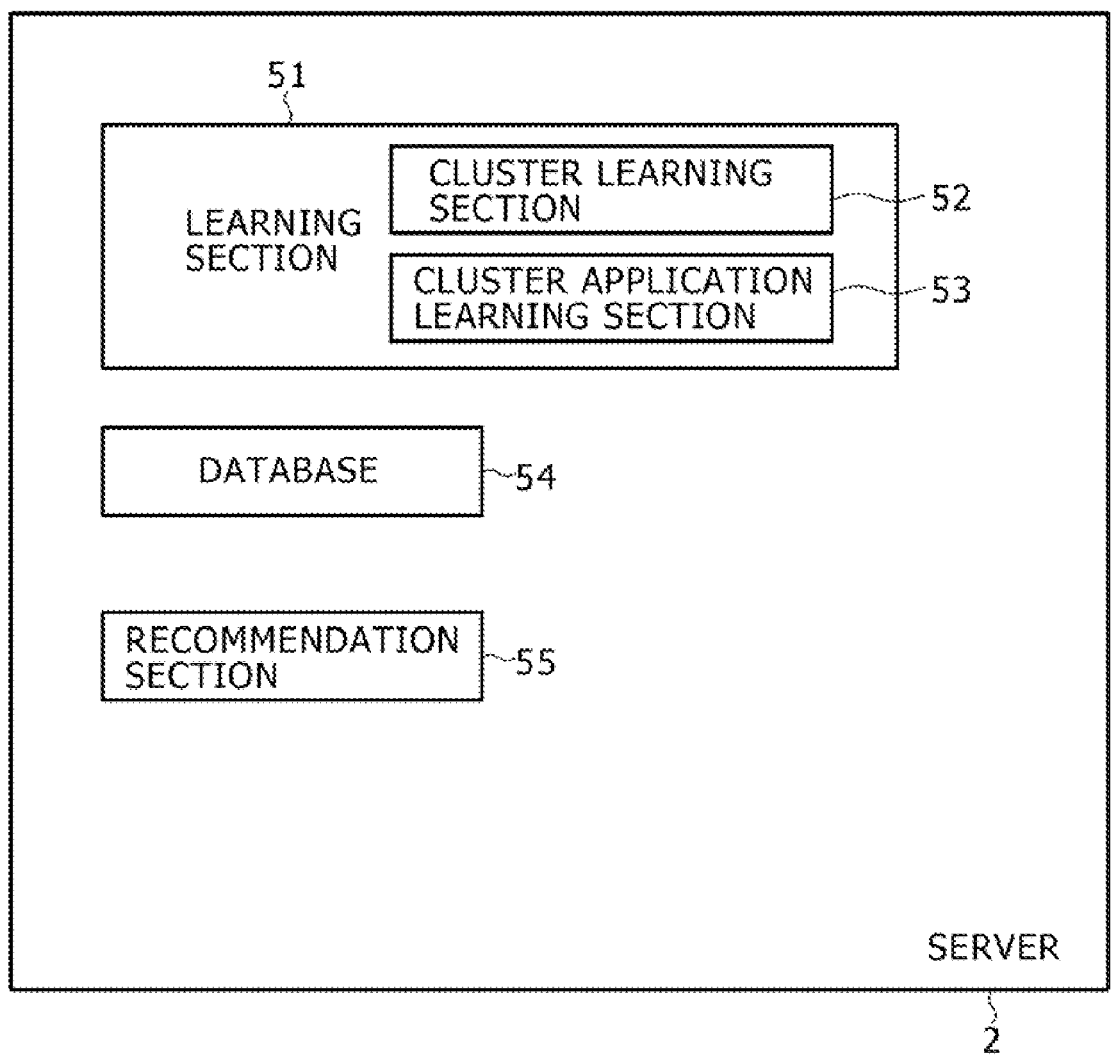
FIG. 3 is a view illustrating functions of the server.

FIG. 3 is a view illustrating functions of the server 2. The server 2 includes a learning section 51 for learning data for classifying data (hereinafter referred to as metadata) of items to be recommended to users and for performing learning for classifying new data from learned data. The learning section 51 is configured including a cluster learning section 52 and a cluster application learning section 53.

The cluster learning section 52 is a function for learning data (cluster) for classifying metadata. The cluster application learning section 53 is a function for performing learning for applying a cluster to metadata of new information (hereinafter referred to suitably as item). It is to be noted that, in the following description of the present description, the term item has meanings of an item to be provided as data of music, a broadcasting program or a program to a user and an item which can be made an object to which information of an item to be provided as a substance such as a consumer electrical appliance (in this instance, the information is information described in metadata or other information associated with metadata) is to be added.

The server 2 includes a database 54 for storing data such as metadata. Further, the server 2 includes a recommendation section 55 for executing a process for referring to metadata stored in the database 54 to recommend suitable information to a user.

In the following description, a case wherein music is provided as an item is described as an example. Therefore, a case wherein also metadata is data regarding music is described as an example.

Figure 4:
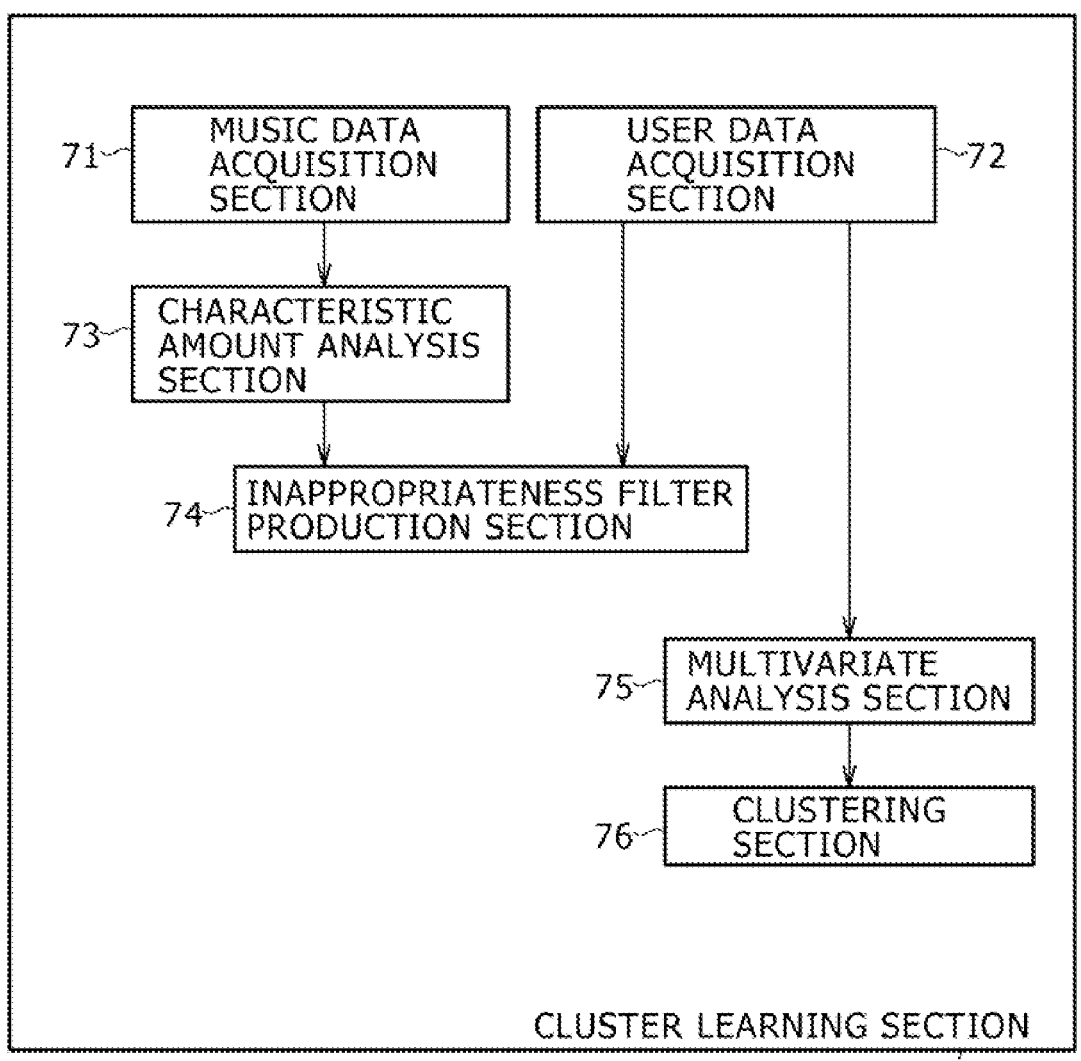
FIG. 4 is a view showing an example of a configuration of a cluster learning section.

FIG. 4 is a view showing an example of a configuration of the cluster learning section 52. The cluster learning section 52 includes a music data acquisition section 71, a user data acquisition section 72, a characteristic amount analysis section 73, an inappropriateness filter production section 74, a multivariate analysis section 75 and a clustering section 76.

The music data acquisition section 71 acquires data of music (data of music itself) to be provided to the user side (terminal 3). The user data acquisition section acquires information (as hereinafter described, information of a result of a questionnaire) from users. The characteristic amount analysis section 73 analyzes music data acquired by the music data acquisition section 71 to extract characteristic amounts (for example, speed, tempo and so forth) of the music and produce information of the music.

As hereinafter described, information called cluster is applied to metadata of music. The cluster is information having a role as an identifier to be applied in response to a mood (Mood, feeling or state of mind of a user). As hereinafter described, the inappropriateness filter production section 74 produces, when a cluster is to be applied to metadata of music to which no cluster is applied, a filter for blocking metadata which should not be made an object of the cluster to be applied.

The inappropriateness filter production section 74 uses data (characteristic amounts) of music supplied from the characteristic amount analysis section 73 and data from a user acquired from the user data acquisition section 72 to produce an inappropriateness filter. Information regarding the produced inappropriateness filter is supplied to and stored into the database 54 (FIG. 3).

The multivariate analysis section 75 digitizes data (information) from a user supplied from the user data acquisition section 72. Then, the clustering section 76 classifies the digitized information for each cluster (produces a cluster).

It is to be noted that, as hereinafter described, a cluster for identifying the mood and a sub cluster for finer classification in the same cluster (in the same mood) are available as clusters. The clustering section 76 produces such a cluster and sub clusters as just mentioned.

The cluster learning section 52 having such a configuration as described above produces an inappropriateness filter and produces a cluster and then applies the cluster to metadata of an object of processing (that is, performs clustering). The cluster application learning section 53 uses a result of the clustering by the cluster learning section 52 to decide to which one of clusters the information to be added newly should belong and applies the cluster.

Figure 5:
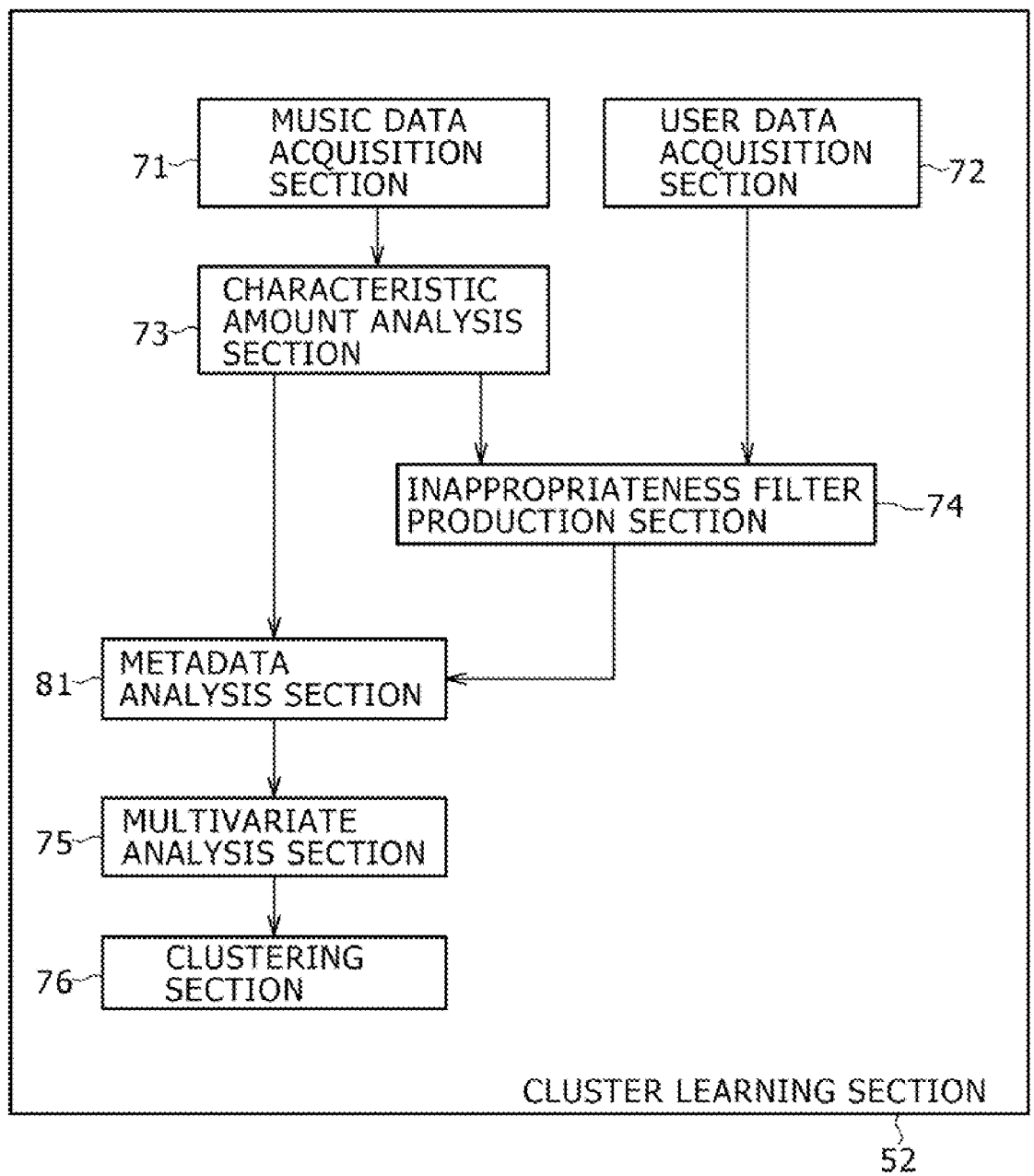
FIG. 5 is a view showing another example of the configuration of the cluster learning section.

FIG. 5 is a view showing another example of the configuration of the cluster learning section 52. When compared with the cluster learning section 52 shown in FIG. 4, the cluster learning section 52' (a dash (') is added in order to make a distinction from the cluster learning section 52 shown in FIG. 4) shown in FIG. 5 is configured such that a metadata analysis section 81 is added to the cluster learning section 52.

Further, the cluster learning section 52' is configured such that, to the metadata analysis section 81 thereof shown in FIG. 5, information of music which is decided as not being inappropriate by the inappropriateness filter production section 74 is supplied from the inappropriateness filter production section 74, and characteristic amounts corresponding to the music are supplied from the characteristic amount analysis section 73. Further, the cluster learning section 52' is configured such that a result of the analysis by the metadata analysis section 81 is supplied to the multivariate analysis section 75.

While the cluster learning section 52 shown in FIG. 4 produces a cluster based on data (information) from a user and executes a clustering process, the cluster learning section 52' shown in FIG. 5 produces a cluster from music data and executes a clustering process. Processes of learning a cluster which are executed by the cluster learning section 52 and the cluster learning section 52' are hereinafter described with reference to flow charts.

FIG. 6 is a view showing an example of a configuration of the cluster application learning section 53. The cluster application learning section 53 includes a metadata acquisition section 111, a characteristic analysis section 112, an inappropriateness filter 113, an item metadata acquisition section 114, a cluster determination section 115 and an addition section 116.

The metadata acquisition section 111 acquires metadata of an item (metadata to which a cluster is applied) used in learning by the cluster learning section 52 (or cluster learning section 52'). The characteristic analysis section 112 detects, from the acquired metadata of the item, characteristics of the item (metadata). The extracted characteristic amounts are supplied to the inappropriateness filter 113. Also information from the item metadata acquisition section 114 is supplied to the inappropriateness filter 113.

The item metadata acquisition section 114 acquires metadata of an item to which a cluster is to be allocated (metadata to which no cluster is applied). The inappropriateness filter 113 decides whether or not the metadata supplied from the item metadata acquisition section 114 should be made an object to which a cluster should be applied (performs filtering). Metadata outputted from the inappropriateness filter 113 as a result of the filtering is metadata to which a cluster should be applied.

The metadata outputted from the inappropriateness filter 113 is supplied to the cluster determination section 115. The cluster determination section 115 refers to the metadata of a predetermined item supplied from the inappropriateness filter 113 to perform matching of characteristics of the metadata referred to and characteristics supplied from the characteristic analysis section 112 to decide a cluster. The decided cluster is added to the metadata of the item of the processing object. The metadata to which the cluster is applied is cumulatively stored into the database 54 by the addition section 116.

The recommendation section 55 uses the metadata to which the cluster is applied in this manner to execute a process of recommending information suitable for the user to the user (in this instance, particularly information suitable for the feeling (mood) of the user).

FIG. 7 is a view showing an example of a configuration of the recommendation section 55. The recommendation section 55 is configured including a mood information acquisition section 141, a mood-cluster conversion section 142 and a recommendation information production section 143. The mood information acquisition section 141 acquires information relating to a mood designated by a user (in the following description, such information is suitably referred to as mood information). The mood information relates to a feeling such as, for example, "sad" or "happy".

The information relating to a mood acquired by the mood information acquisition section 141 is supplied to the mood-cluster conversion section 142. The mood-cluster conversion section 142 converts the mood information from the mood information acquisition section 141 into information of a cluster and supplies the information of the cluster to the recommendation information production section 143. The recommendation information production section 143 reads out items corresponding to the cluster supplied thereto from the database 54 and supplies the items to the user side.

Figures 10, 11:
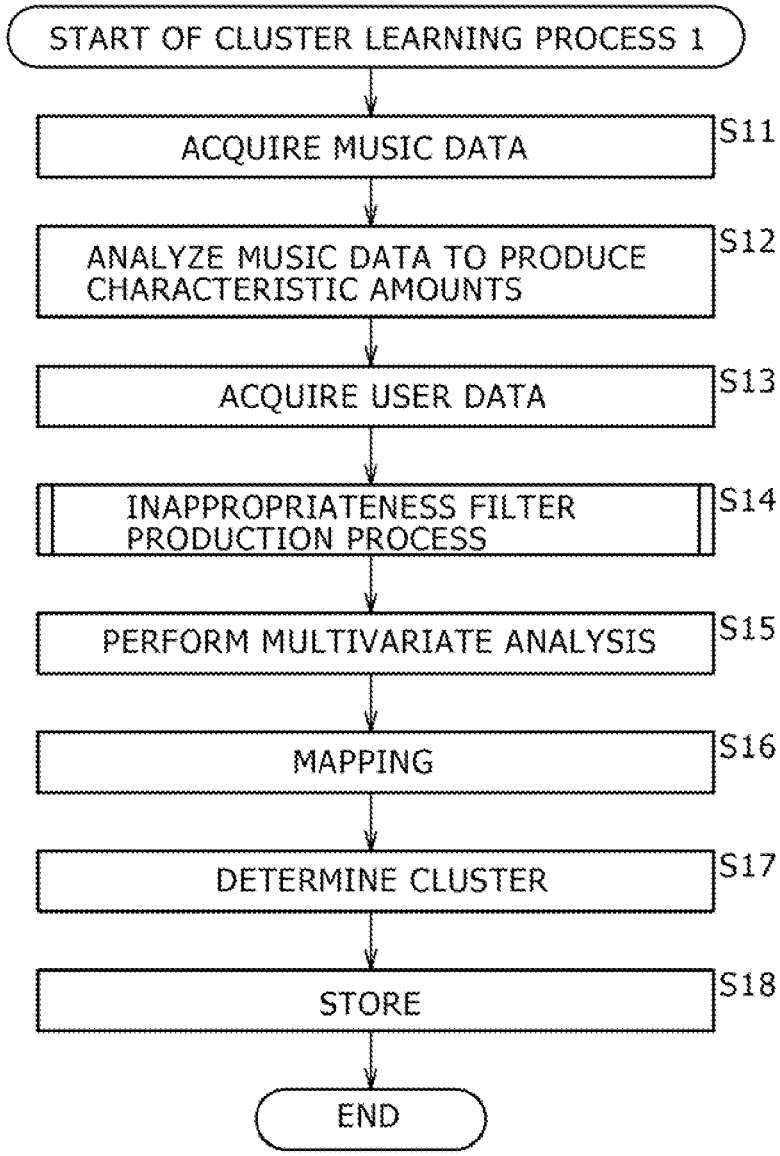
FIG. 10 is a view illustrating a quantification management table.
FIG. 11 is a flow chart illustrating learning of a cluster.

Data such as metadata which are used when such various components as mentioned above perform processing are described. Data are stored in the database 54 (FIG. 3). FIGS. 8 to 10 illustrate data stored in the database 54.

The database 54 stores a questionnaire management table 171 illustrated in FIG. 8 for managing results of collection of questionnaires from users, metadata 172 of items illustrated in FIG. 9 and a quantization management table 173 illustrated in FIG. 10 for managing numerical values digitized individually for the items illustrated in FIG. 10.

In the questionnaire management table 171 illustrated in FIG. 8, results of questionnaires carried out for the items are written. A questionnaire is performed to users, for example, on a network or on paper media. The substance of a questionnaire may be, for example, in the example illustrated in FIG. 8, such as whether or not a certain piece of music should be classified into "sad" music. In other words, a questionnaire is performed for acquiring information of in which mood (feeling, state of mind) what music a user wants to enjoy.

In the questionnaire management table 171 illustrated in FIG. 8, it is described that, for example, with regard to the "music 1", the answer of the "user A" is "○ (the tune sounds sad)", the answer of the "user B" is "○ (the tune sounds sad)", and the answer of the "user C" is described (○ is not described, (the tune does not sound sad)).

Such a questionnaire as described above is performed to a predetermined number of users for a predetermined number of pieces of music. For example, a questionnaire of whether or not each music is sad music is performed to 100 users for 100 pieces of music. Then, a result of the questionnaire is written into the questionnaire management table 171. A similar questionnaire is performed also with regard to a feeling (mood) other than "sad", and information is acquired.

It is to be noted that a questionnaire to the user side may be an alternative type questionnaire of merely asking "whether a music is a sad music" or "whether a music is not a sad music" or may include a choice of "normal" or else may further include such a choice as "very sad". In other words, there is no restriction to the number of choices in a questionnaire, and a questionnaire management table 171 corresponding to a questionnaire carried out is produced.

Further, a plurality of questionnaires may be carried out with regard to a similar feeling. For example, with regard to a feeling of "sad", a questionnaire regarding such a similar feeling as "sorrowful" or "grief" may be carried out.

In this manner, the questionnaire management table 171 is a table in which results of questionnaires carried out for users are described and managed.

FIG. 9 illustrates metadata of music. The metadata 172 illustrated in FIG. 9 are those where the item is music and are data in which information regarding the music is described. In the metadata 172 illustrated in FIG. 9, such items as item NO., genre, artist, tempo, harmony, cluster and sub cluster are provided, and information corresponding to the items is managed in an associated relationship with each other.

For example, for the metadata where the item ID is "I-001", that the genre is "Rock"; that the artist is "ABC"; that the tempo is "24"; that the harmony is "A"; that the cluster is "1"; and that the sub cluster is "1" are described in an associated relationship with each other.

Such information as the item NO., genre and artist may be written into the metadata 172 manually, and such information as the tempo and the harmony may be written not manually but through an analysis of music. Meanwhile, the cluster and the sub cluster are information which is added in a learning process or an application process of a cluster hereinafter described.

Such a quantization management table 173 as seen in FIG. 10 is produced from the questionnaire management table 171 illustrated in FIG. 8 or the metadata 172 illustrated in FIG. 9. The quantization management table 173 is produced from information from which, for example, such a predetermined pattern as seen in FIG. 8 (in FIG. 8, a pattern of pieces of music which are set as "sad music" by a certain user).

Where the quantization management table 173 is produced from the metadata 172 illustrated in FIG. 9, for example, metadata 172 of a plurality of pieces of music classified as "sad music" are analyzed, and a predetermined pattern (for example, a distribution in speed is analyzed to extract a pattern) is produced from a result of the analysis. Then, the pattern is used to produce the quantization management table 173.

In the quantization management table 173, a value for each dimension is described for each tune. In particular, a pattern is read from such a table as illustrated in FIG. 8 and quantized, and in this instance, information when a predetermined music is represented by information of several dimensions is described into the quantization management table 173. In the example illustrated in FIG. 10, it is described that the value of the dimension 1 of the "music 1" is "0.12"; the value of the dimension 2 is "0.34"; and the value of the dimension 3 is "0.62".

It is to be noted that the number of dimensions may be any number. A dimension is determined by a manner of processing (what method is used for quantization) and determined to a dimension necessary for processing upon classification into clusters hereinafter described. The quantization management table 173 is used in processing when a cluster is determined as hereinafter described.

[Learning Process of a Cluster (Sub Cluster)]

Processes in which such data as described above are used are described. First, a process performed by the cluster learning section 52 (FIG. 4) of the learning section 51 is described with reference to a flow chart of FIG. 11. At step S11, the music data acquisition section 71 of the cluster learning section 52 acquires music data. The music data may be stored into the database 54 (FIG. 3) such that such stored music data may be acquired or may be acquired from another server (not shown) through the network 1 (FIG. 1).

It is to be noted that music data are data of a piece of music itself and, for example, data of the WAV type.

At step S12, the characteristic amount analysis section 73 analyzes the music data acquired by the music data acquisition section 71 to extract characteristic amounts of the music. The characteristic amounts to be extracted are, for example, information described in the metadata 172 (FIG. 9) (information of the tempo and the harmony).

While it is described here that music data are acquired by the music data acquisition section 71 and the acquired music data are analyzed by the characteristic amount analysis section 73 to extract characteristic amounts, where the metadata 172 are described in the database 54 without performing such processes as acquisition analysis and extraction, the metadata 172 may be acquired. In other words, a process of acquiring the metadata 172 from the database 54 may be performed in place of the process at step S11 and the process at step S12.

At step S13, the user data acquisition section 72 acquires user data. The information acquired at step S13 is results of questionnaires from users. Where results of questionnaires from users are acquired at step S13, for example, the results are acquired in advance as results of questionnaires carried out using paper media or acquired through collection of results of questionnaires carried out on the network. Where questionnaire results are acquired in this manner, such a questionnaire management table 171 as illustrated in FIG. 8 is acquired.

A questionnaire may be, for example, of such a substance as 'which do you feel this music "sad" or "not sad"' to 100 persons for 100 pieces of music. In particular, in this instance, with regard to a predetermined number of pieces of music, an answer of music which belongs to a predetermined mood (feeling) is acquired as information from a predetermined number of users. Then, such a questionnaire management table 171 as seen in FIG. 8 is produced.

Information (user data) from users is acquired in this manner at step S13. The information acquired at step S13 is results of questionnaires and information which relies upon the liking and/or sense of value of the users.

It is to be noted here that, while, as the process at step S13, user data are acquired and analyzed to produce the questionnaire management table 171, even if the process is not performed as one process (one step) of a cluster learning process, such a process may be executed to produce the questionnaire management table 171 at another point of time (at a point of time before the learning process is performed). The questionnaire management table 171 produced is stored into the database 54, and at step S13, a process of acquiring the questionnaire management table 171 stored in the database 54 may be executed.

Figure 12:
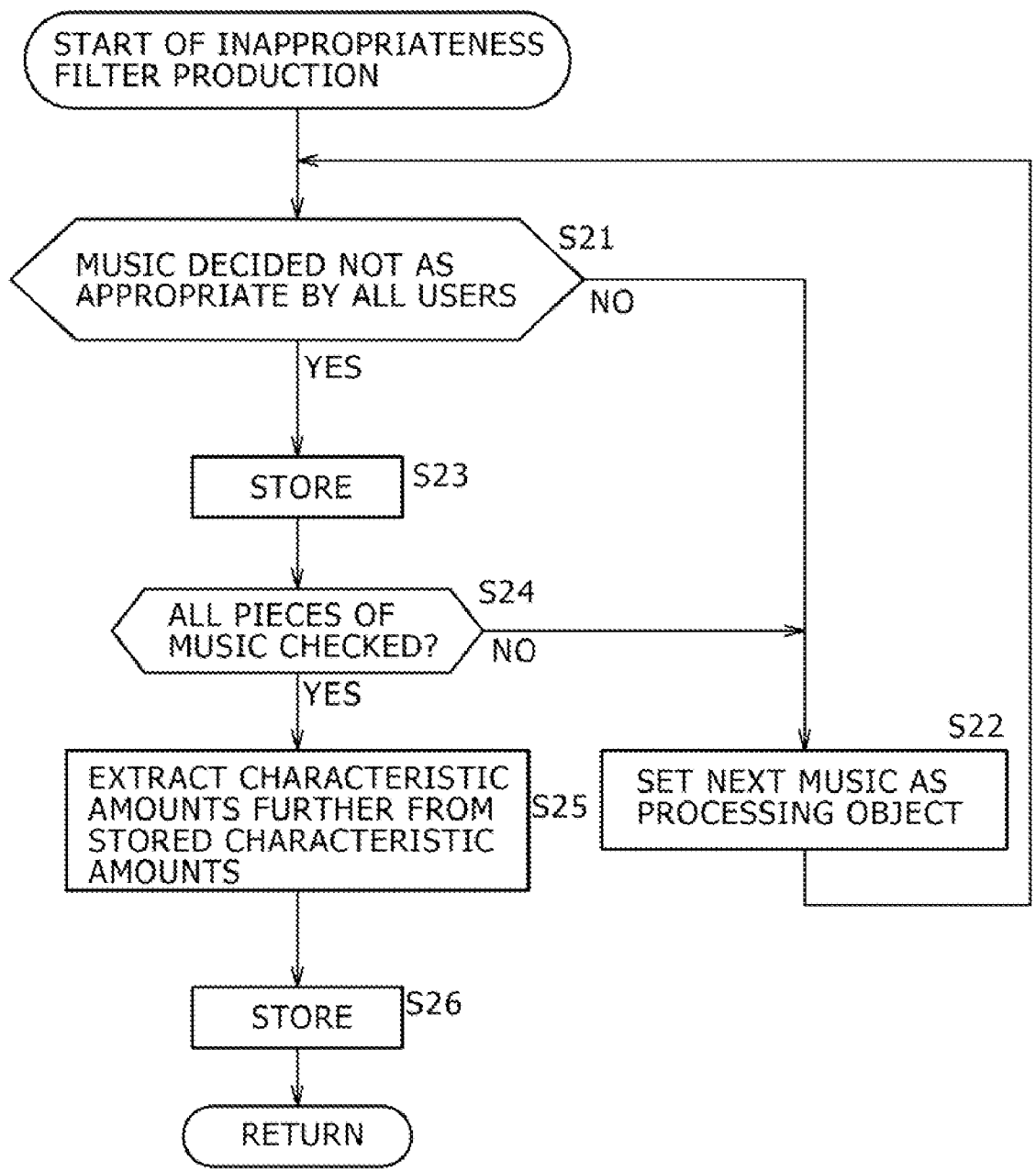
FIG. 12 is a flow chart illustrating an inappropriateness filter production process.

At step S14, the inappropriateness filter production section 74 produces an inappropriateness filter. The inappropriateness filter production process at step S14 is described with reference to a flow chart of FIG. 12.

At step S21, the user data (questionnaire management table 171) acquired at step S13 (FIG. 11) are referred to decide whether or not the piece of music of the processing object (for example, the music 1) is music which is not decided as corresponding to the mood (for example, "sad") of the processing object by all users.

The inappropriateness filter is a filter for excluding, when a cluster is applied, metadata to which a cluster may not be applied. For example, a piece of music which is not provided at all in a "sad" mood is music (metadata of the music) to which a cluster associated with the mood of "sad" is not applied at all and which may be excluded when a process of applying a cluster associated with the mood of "sad" is executed. A filter for executing a process of extracting metadata to which a cluster should be applied so that such music which may be excluded as described above may be excluded is an inappropriateness filter.

Since an inappropriateness filter is such a filter as just described, it preferably can exclude music (metadata) which is estimated as not being appropriate music with certainty. In other words, the inappropriateness filter is preferably formed such that, for example, any music which is considered as "sad music" at least by one person is not excluded by a process by the inappropriateness filter. However, whether such a performance as just described is required can be changed suitably at the stage of designing.

Further, where the inappropriateness filter is used, a piece of music which is estimated as not being appropriate with certainty can be excluded, and the number of pieces of music which may become an object of application, for example, when a sub cluster is to be applied to a predetermined piece of music (item) as hereinafter described can be reduced. Since, when a great number of pieces of music are to be processed or in a like case, the pieces of music can be processed efficiently, it is effective to provide an inappropriateness filter.

However, for example, where the number of pieces of music themselves which are estimated as not being appropriate with certainty is small, that is, where the number of pieces of music themselves of an object of exclusion is small, even if an inappropriateness filter is provided, the number of pieces of music to be excluded is small. Therefore, in such a case that the effect by provision of an inappropriateness filter is considered low, no such inappropriateness filter may be provided. In other words, it is possible to set such that, at the stage of designing or the like, an inappropriateness filter is not provided for a predetermined mood.

The process at step S21 is executed with reference to the user data (questionnaire management table 171) acquired by the characteristic amount analysis section 73. In the questionnaire management table 171, a result of decision of the user regarding whether or not, as regards a predetermined mood (in FIG. 8, the mood of "sad"), a predetermined piece of music is appropriate to the predetermined mood as described hereinabove with reference to FIG. 8 is described.

For example, if the questionnaire management table 171 illustrated in FIG. 8 is referred to, then it can be recognized that the "music 1" is voted as being sad music by the "user A" and the "user B". Further, it can be recognized that the "music 2" is not voted as being sad music by all of the users A, B and C. Although only the voting results of the users A, B and C are illustrated, it is assumed that, as regards the "music 2", none of the users votes it as being "sad music". Such music as just described is music which can be decided as not being provided in the sad mood.

The inappropriateness filter production section 74 extracts such pieces of music which are decided as not being appropriate to a predetermined mood (mood which is a processing object) by all users. In this instance, the "music 2" is extracted. It is to be noted that, while "all users" are mentioned here, the accuracy of the filter may be changed suitably as described hereinabove, and those pieces of music which are decided as being not appropriate to a predetermined mood, for example, by not "all users" but by "a number of users less than the number of users of an object of research" may be extracted.

If it is decided at step S21 that the music of the processing object is not a music which is decided as not being appropriate by all users, then the processing advances to step S22, at which a next piece of music described in the questionnaire management table 171 is set to music of a processing object. Then, the processes at the steps beginning with step S21 are repeated.

On the other hand, if it is decided at step S21 that the music of the processing object is decided as not being appropriate by all users, the processing advances to step S23, at which the characteristic amounts of the music are stored (accumulated) once. To the inappropriateness filter production section 74, the characteristic amounts of the music are supplied from the characteristic amount analysis section 73. The characteristic amounts supplied are characteristic amounts of the music of the processing object.

At step S24, it is decided whether or not all pieces of music (all pieces of music relating to the mood of the processing object) described in the questionnaire management table 171 are checked. If it is decided at step S24 that all pieces of music are not checked, then the processing advances to step S22, at which the music of the processing object is set to a next piece of music. Then, the processes at the steps beginning with step S21 are repeated.

On the other hand, if it is decided at step S24 that all pieces of music are checked, then the processing advances to step S25. At step S25, further characteristic amounts are extracted from the stored characteristic amounts. As the processes at steps S21 to S24 are repeated, the characteristic amounts of the pieces of music which are not appropriate to the predetermined mood are stored. The characteristic amounts common to the pieces of music are outputted as a process at step S25.

The characteristic amounts extracted at step S25 are stored as data of the inappropriateness filter into the database 54 at step S26.

An inappropriateness filter for the predetermined mood is produced in this manner. As such processes are repeated, an inappropriateness filter is produced for each of a plurality of moods.

Returning to description of the flow chart of FIG. 11, at step S14, such an inappropriateness filter production process as described above is executed, and at step S15, a process of multivariate analysis by the multivariate analysis section 75 is executed.

For example, as multivariate analysis is executed for the information described in such a questionnaire management table 171 as illustrated in FIG. 8, such a quantization management table 173 as illustrated in FIG. 10 is produced. In particular, characteristics of each music based on feelings (moods) of users are quantized by the multivariate analysis such as correspondence analysis or principal component analysis from answer patterns of such a questionnaire management table 171 as illustrated in FIG. 8.

The quantization management table 173 illustrated in FIG. 10 is used to manage information of pieces of music as multidimensional digitized data. Such a quantization management table 173 as just described is produced at step S15.

At step S15, information (numerical values) described in the quantization management table 173 is mapped. For example, it is considered to map numerical values described in the columns of the dimension 1 and the dimension 2 of the quantization management table 173 illustrated in FIG. 10. By making the dimension 1 correspond, for example, to an X axis and making the dimension 2 correspond, for example, to a Y axis, characteristics (information) of the pieces of music described in the quantization management table 153 can be mapped in two dimensions including the two axes of the X axis and the Y axis. Where such mapping is performed, for example, such a graph as seen in FIG. 13 can be acquired.

Figure 13:
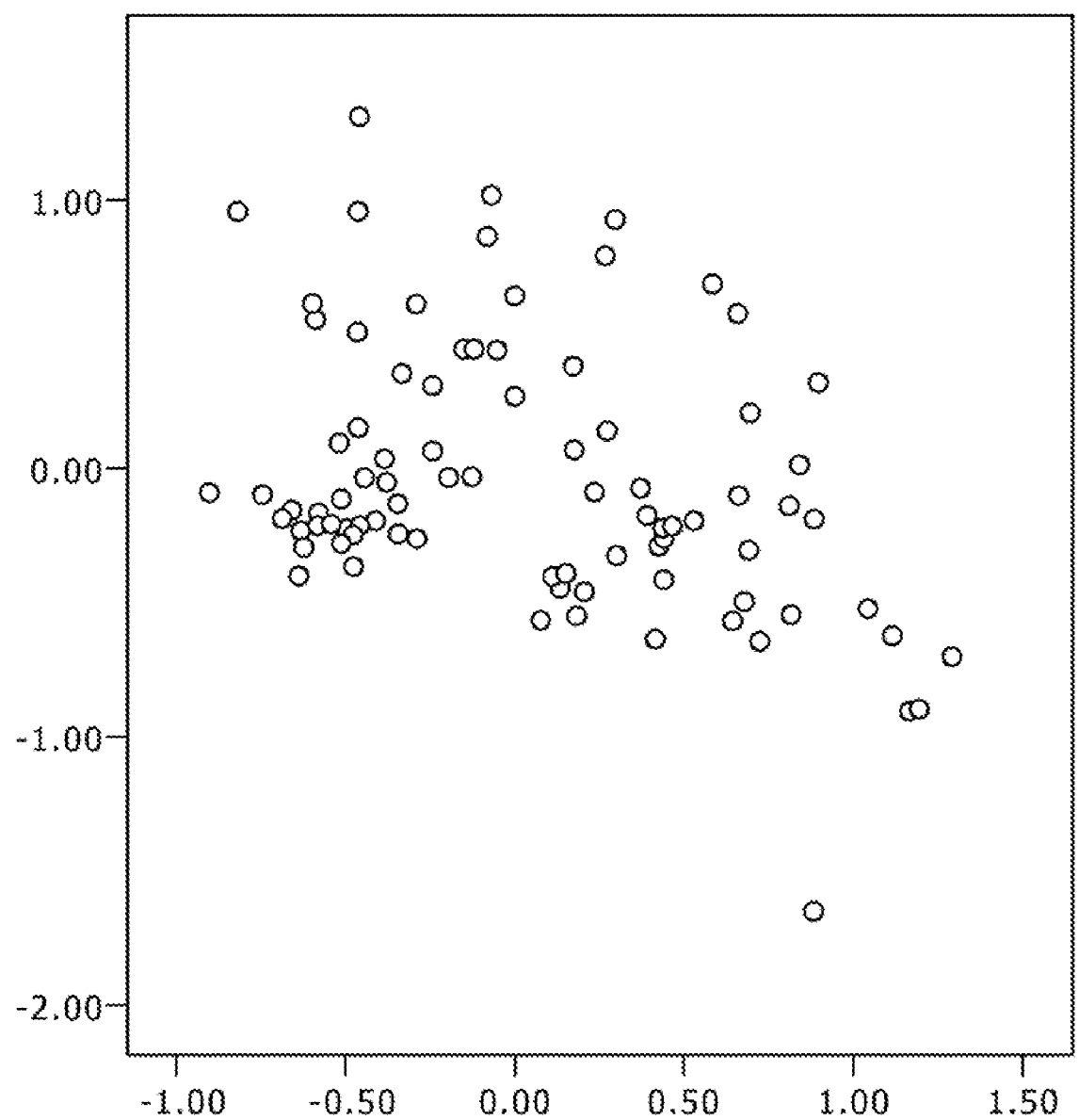
FIG. 13 is a view illustrating setting of sub clusters.

FIG. 13 illustrates an example of a graph where the pieces of music described in such a quantization management table 173 as illustrated in FIG. 10 are mapped using the numerical values of the dimension 1 and the dimension 2 for each piece of music. The mapping is performed for the number of pieces of music described in the quantization management table 173 (for example, for 100 pieces of music (the number of pieces of music from which those pieces of music based on which the inappropriateness filter is produced are excluded)). Since such a process as described above is performed, the dimensions when multivariate conversion is performed may be determined depending upon to what dimensions mapping should be performed and whether or not a process hereinafter described is executed. For example, where mapping to two dimensions is performed and the process hereinafter is executed, multivariate conversion may be quantization into two-dimensional data.

After such a graph as seen in FIG. 13 is produced, a cluster is determined at step S17 (FIG. 11). A cluster is determined, for example, by analyzing the graph illustrated in FIG. 13 to divide the graph for each well-crowded portion (a portion in which dots are concentrated) and allocating the divided regions to cluster 1, cluster 2 and so forth.

The clustering is performed by such a method, for example, as a k-means method or a hierarchy method.

Figure 14:
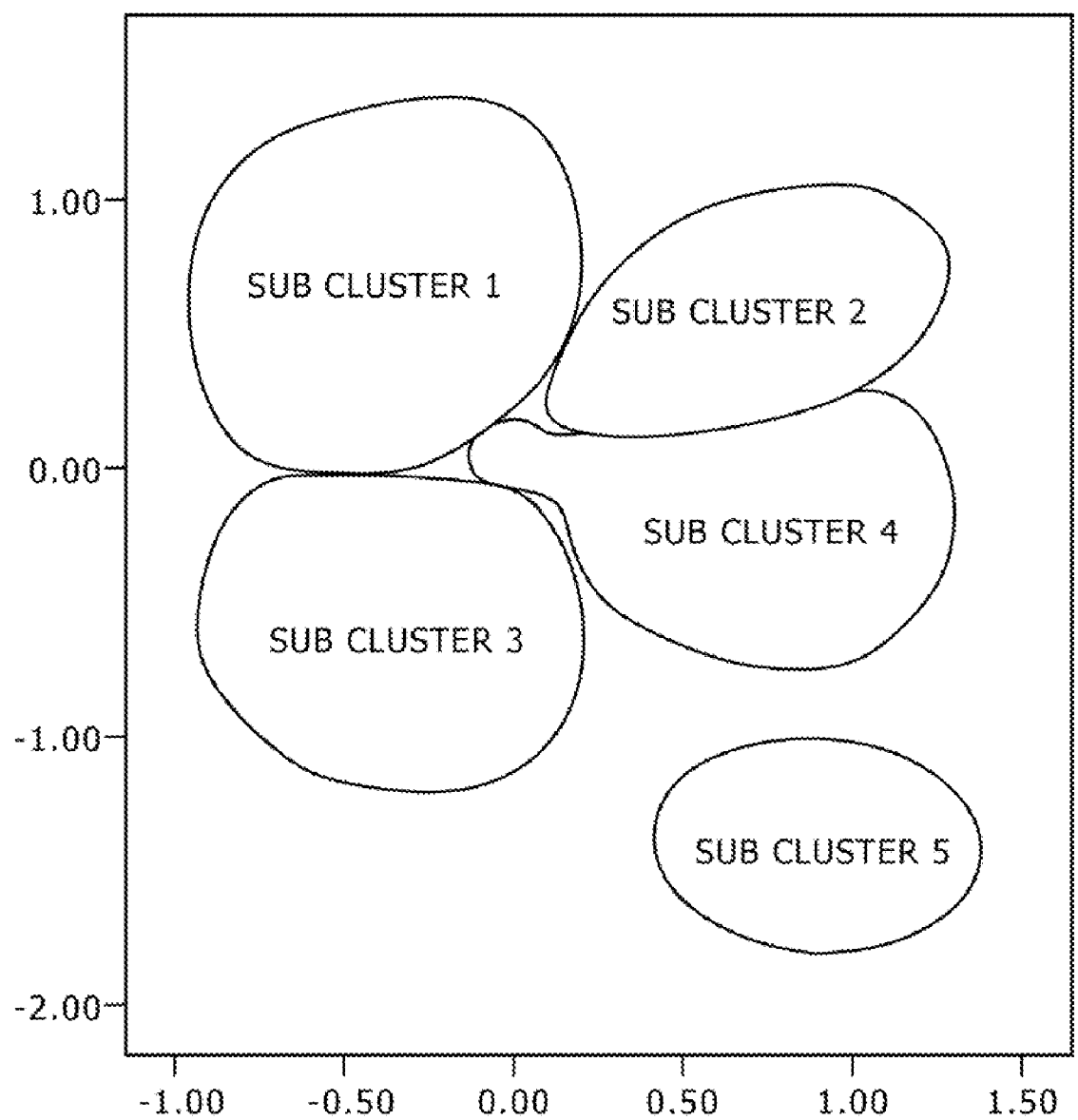
FIG. 14 is a view illustrating the setting of sub clusters.

As clustering is performed, for example, such a result as seen in FIG. 14 is acquired from the graph illustrated in FIG. 13. The result illustrated in FIG. 14 illustrates a state upon classification into five sub clusters 1 to 5. The sub clusters are set in a state wherein they have no overlap with each other. By setting the sub clusters so as not to have an overlap with each other in this manner, it is possible to allocate one sub cluster to one item.

Also it is possible to set the sub clusters such that they may have an overlap with each other. Where clustering is performed using a clustering method called soft clustering method or in the like case, an overlap sometimes occurs between sub clusters. In such a case that sub clusters have an overlap, the ratio by which an item is occupied by a plurality of sub clusters is allocated in such a manner that, for example, the sub cluster 1 occupies 90% and the sub cluster 2 occupies 10%.

Further, where an overlap between sub clusters is permitted, the sum of values of the sub clusters need not necessarily be 100%. For example, the sub cluster 1 may occupy 80% and the cluster 2 may occupy 30%.

In the present embodiment, only it is necessary for a predetermined item to be capable of being classified into a predetermined cluster and a sub cluster of the cluster. For example, if it is determined as a result of clustering that the predetermined item belongs to a predetermined cluster and the sub cluster 1 in the cluster occupies 80% and the sub cluster 2 occupies 30%, then when the predetermined item is classified into sub clusters which have such an overlap as just described, it should be determined that the predetermined item should be classified into the sub cluster 1 which has a comparatively high percentage. Therefore, even if sub clusters are derived such that they have an overlap with each other (a soft clustering method is used), or even if another technique which does not permit an overlap between sub clusters is used, since classification of an item (process of applying a sub cluster) can be performed, any one of the methods may be used.

In particular, when a predetermined item is classified so as to belong to a predetermined sub cluster, only the probability (belonging degree) with which the item may belong to the sub cluster must be determined. Here, the following description proceeds under the assumption that the sub clusters do not overlap with each other as seen in FIG. 14.

Here, the following description proceeds under the assumption that the sub clusters do not overlap with each other as seen in FIG. 14.

Here, further description is given of a cluster and sub clusters. It is described here that the clusters 1 to 5 are produced as a result of execution of such a process as described above. The sub clusters 1 to 5 are originally produced as a result of a process performed for one mood. In other words, in this instance, the sub clusters 1 to 5 are produced by clustering pieces of music appropriate to "sad" music to the mood of "sad".

Here, if, for example, the "cluster 1" which is a cluster of a higher hierarchy to a sub cluster is allocated to the mood of "sad", then the sub clusters 1 to 5 exist for the mood of "sad" of the cluster 1. In this manner, a cluster for identifying a predetermined mood is called "cluster" and a plurality of clusters which belong to the cluster are called "sub clusters". In this instance, the mood of "sad" is the cluster 1, and the sub clusters belonging to the cluster 1 are the sub clusters 1 to 5.

The process at step S17 (FIG. 11) by which a cluster is determined is a process of allocating a cluster which is not allocated to any other mood to a mood of an object of processing and allocating a cluster obtained as a result of a mapping process as a sub cluster.

After sub clusters are derived from predetermined information in this manner, the derived sub clusters are stored at step S18 (FIG. 11).

As described above, for example, when user data is acquired at step S13, such a questionnaire management table 171 as seen in FIG. 8 is acquired. In the questionnaire management table 171, information is managed for each music such as the music 1 or music 2.

Each piece of music has metadata annexed thereto. The metadata is a table wherein information relating to items such as system NO., genre, artist, tempo, harmony, cluster and sub cluster is associated with each other like such metadata 172 as illustrated in FIG. 9. Among such items, the items other than those of cluster and sub cluster, that is, the items of item NO., genre, artist, tempo and harmony, are information applied as metadata of music in advance (the metadata of the pieces of music are stored in a state wherein information regarding the items is described in the database 54).

Metadata of music (item) used for a process of determination of a cluster are in a state wherein information regarding the item of cluster is not described. Therefore, at step 18, into columns of the items of cluster and sub cluster of metadata corresponding to a piece of music (item) of a processing object at the steps beginning with step S11, corresponding cluster and sub clusters are written.

In this manner, to metadata of music used for a cluster learning process, a cluster and sub clusters obtained as a result of learning are set, and they are written into the columns of cluster and sub cluster of the metadata.

For example, to a piece of music with regard to which the item NO. of the metadata 172 illustrated in FIG. 9 is "1-001", "1" is allocated as the cluster and "2" is allocated as the sub cluster, and they indicate states wherein the values are described. Further, to another piece of music with regard to which the item NO. is "1-002", "1" is allocated as the cluster and "3" is allocated as the sub cluster, and they indicate states wherein the values are described.

In this manner, the music with regard to which the item NO. is "1-001" and the music with regard to which the item NO. is "1-002" are classified commonly into the cluster "1". Therefore, the pieces of music belong to the same mood. However, the sub cluster is "2" with regard to the piece of music of "1-001" and "3" with regard to the piece of music of "1-002", and the pieces of music are classified into different sub clusters. Therefore, where the sub cluster is taken into consideration, even if pieces of music belong to the same mood, they are classified in different classes.

It is to be noted here that, while the following description proceeds under the assumption that pieces of music are classified into clusters and sub clusters under the clusters, also it is possible to apply sub clusters under such sub clusters. In particular, if such a cluster learning process as described hereinabove is performed for one sub cluster (referred to as sub cluster A), then a plurality of clusters are produced for the sub cluster A, and it is possible to set the produced clusters as sub clusters of the sub cluster A. By applying sub clusters under a sub cluster in this manner, further finer classification can be achieved.

The cluster learning process described above with reference to FIG. 11 is a process by the cluster learning section 52 shown in FIG. 4. Now, a cluster learning process performed by the cluster learning section 52' shown in FIG. 5 is described with reference to a flow chart of FIG. 15.

Figure 15:
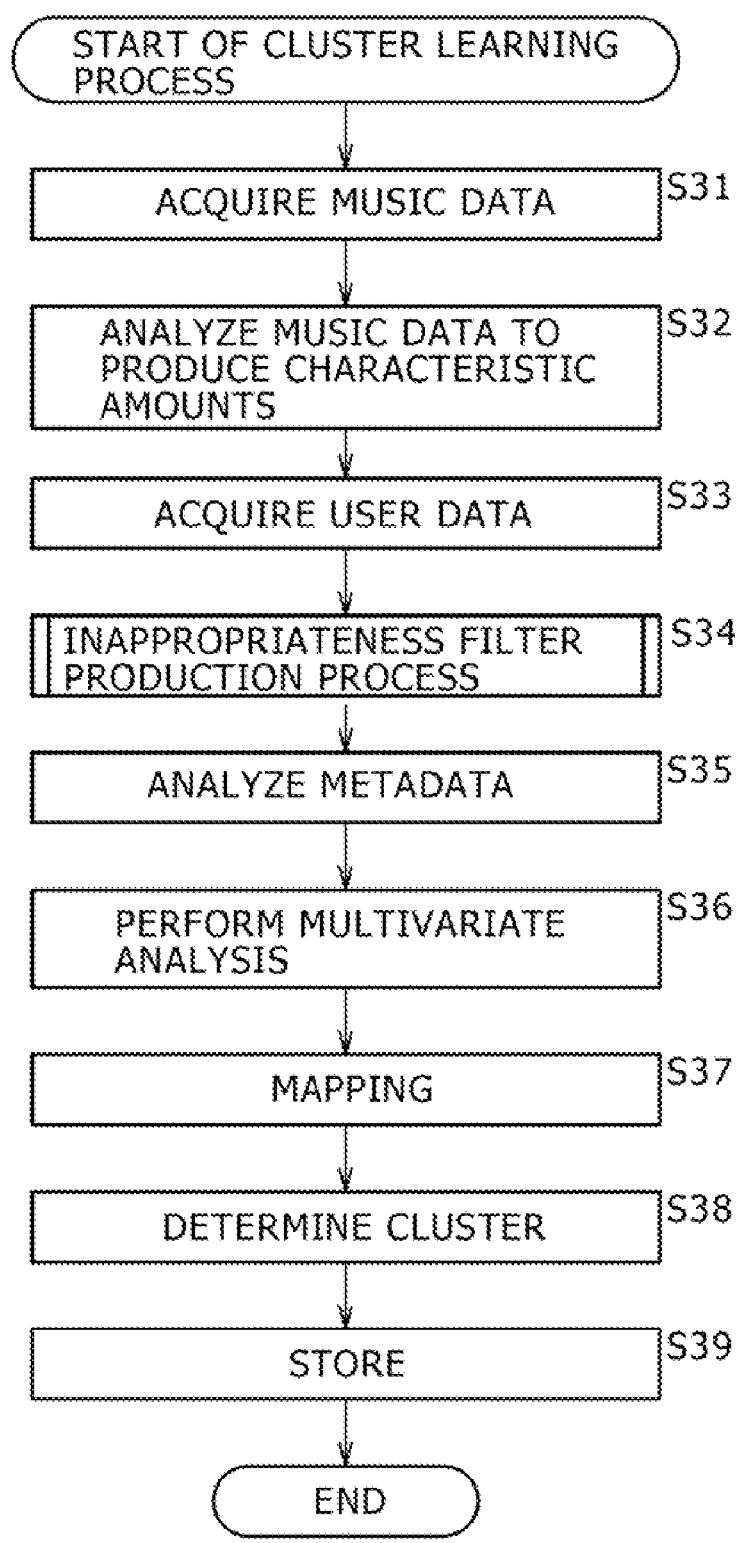
FIG. 15 is a flow chart illustrating different learning of a cluster.

Of the flow chart of FIG. 15, processes at steps S31 to S34 are similar to the processes at steps S11 to S14 of FIG. 11, and therefore, description of them is omitted. In other words, also by the cluster learning section 52' (FIG. 5), an inappropriateness filter is produced by a process similar to the process performed by the cluster learning section 52 (FIG. 4) described hereinabove.

At step S35, the metadata analysis section 81 analyzes the metadata. In the metadata, characteristic amounts of the pieces of music such as the tempo are described, for example, as in the metadata 172 illustrated in FIG. 9. Such characteristic amounts of the music pieces are acquired from the characteristic amount analysis section 73. The characteristic amount analysis section 73 acquires characteristic amounts by extracting the characteristic amounts from music data or acquiring the metadata 172 stored in the database 54 or the like in advance as described hereinabove, and supplies the characteristic amounts to the metadata analysis section 81.

Further, the characteristic amounts of the pieces of music supplied from the metadata analysis section 81 relate to the pieces of music other than those pieces of music which are decided as not being appropriate by the inappropriateness filter production section 74. In particular, the metadata analysis section 81 acquires metadata of those pieces of music which are decided as being appropriate to a predetermined mood and performs analysis of the metadata. The analysis of metadata is, for example, a process for checking what characteristics a piece of music decided as being appropriate has.

A result of the analysis by the metadata analysis section 81 is supplied to the multivariate analysis section 75. The multivariate analysis section 75 performs multivariate analysis at step S36. Processes at the steps beginning with step S36 (processes performed by the multivariate analysis section 75 and the clustering section 76) are similar to the processes at the steps beginning with step S15 of FIG. 11, and therefore, description of them is omitted.

In this manner, the cluster learning section 52' shown in FIG. 5 analyzes metadata of those pieces of music which are decided as being appropriate to a predetermined mood to produce clusters. Also in such an instance as just described, clusters and sub clusters are produced similarly as described hereinabove, and also effects by the provision of sub clusters can be achieved similarly.

Different learning of a cluster (sub clusters) is described. The cluster learning process described below is performed by the cluster learning section 52 shown in FIG. 4. Further, production of an inappropriateness filter is performed similarly as described hereinabove, and therefore, description of this is omitted.

Figure 16:
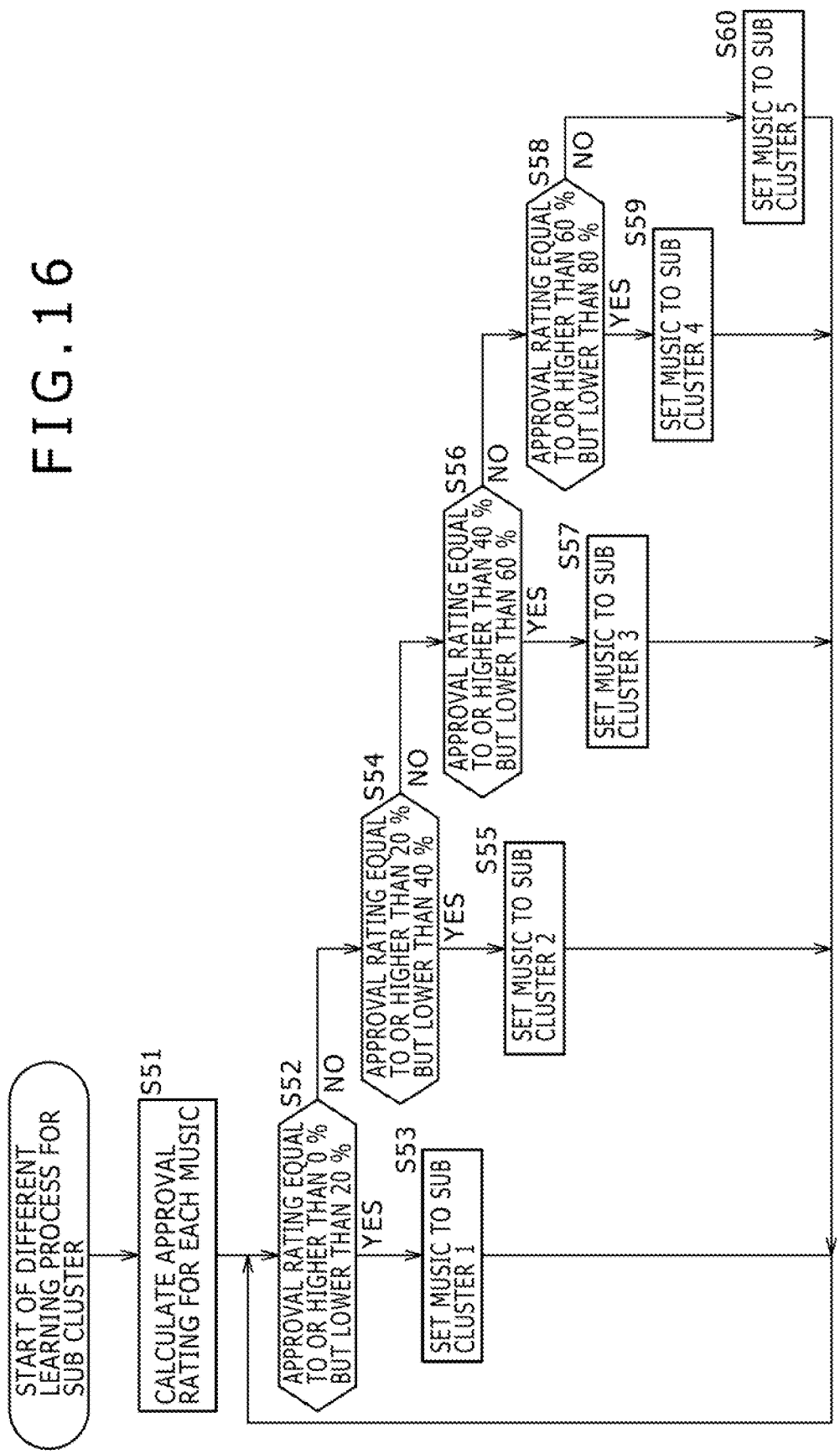
FIG. 16 is a flow chart illustrating different learning of a sub cluster.

The cluster learning described hereinabove is an example wherein a process such as mapping or the like is performed to perform cluster learning. Here, taking an example wherein an approval rating of users is used to perform learning of a cluster as an example, the cluster learning is described with reference to a flow chart of FIG. 16. The approval rating of users is determined, for example, by checking by what number of users from within the number of users determined as an object of the checking it is decided that an item determined as an object of the checking (the following description proceeds taking a music as an example of an item) is appropriate to a mood of an object of the checking. For example, if the number of users of an object of checking is 100 and three of them decide that the music 1 is a "sad music", then the approval rating for the music 1 is calculated as 3%.

Further, as regards a cluster, since a cluster corresponding to the mood of the processing object (cluster associated or associating) is allocated at a point of time when a mood of an object of processing is determined, the following description relates to a sub cluster learning process.

At step S51, the approval rating is calculated for those pieces of music (for example, 100 pieces of music) which make an object of checking. This calculation is performed by referring to the questionnaire management table 171 shown in FIG. 8. In particular, the calculation mentioned is performed by calculating the number of users who decide that the music set as a piece of music of a checking object is appropriate to a mode of an object of checking.

At step S52, it is decided whether or not the approval rating of a predetermined piece of music is equal to or higher than 0% but lower than 20%. If it is decided at step S52 that the approval rating of the predetermined piece of music is equal to or higher than 0% but lower than 20%, then the sub cluster of the music piece of the processing object is set as the sub cluster at step S53. The set sub cluster is stored as a piece of information in the metadata of the music of the processing object.

On the other hand, if it is not decided at step S52 that the approval rating of the predetermined piece of music is equal to or higher than 0% but lower than 20%, then the processing advances to step S54, at which it is decided whether or not the approval rating is equal to or higher than 20% but lower than 40%. If it is decided at step S54 that the approval rating is equal to or higher than 20% but lower than 40%, then the sub cluster of the music of the processing object is set as the sub cluster 2. The set sub cluster is stored as a piece of information in the metadata of the music of the processing object.

On the other hand, if it is not decided at step S54 that the approval rating is equal to or higher than 20% but lower than 40%, then the processing advances to step S56, at which it is decided whether or not the approval rating is equal to or higher than 40% but lower than 60%. If it is decided at step S56 that the approval rating is equal to or higher than 40% but lower than 60%, then the sub cluster of the music of the processing object is set as the sub cluster 3. The set sub cluster is stored as a piece of information in the metadata of the music of the processing object.

On the other hand, if it is not decided at step S56 that the approval rating is equal to or higher than 40% but lower than 60%, then the processing advances to step S58, at which it is decided whether or not the approval rating is equal to or higher than 60% but lower than 80%. If it is decided at step S58 that the approval rating is equal to or higher than 60% but lower than 80%, then the sub cluster of the music of the processing object is set as the sub cluster 4. The set sub cluster is stored as a piece of information in the metadata of the music of the processing object.

On the other hand, if it is not decided at step S58 that the approval rating is equal to or higher than 60% but lower than 80%, then the processing advances to step S60, at which the sub cluster of the music of the processing object is set as the sub cluster 5. The set sub cluster is stored as a piece of information in the metadata of the music of the processing object.

As the processes at steps S52 to S60 are repeated, sub clusters are applied for each music. In this manner, the approval rating of users may be used to perform learning of a sub cluster. Also in this instance, since the approval rating of users is used (this approval rating itself can be calculated from the purchase history of users and so forth and therefore information from the users is used), learning of a sub cluster on which the liking of users is reflected can be performed similarly as in the case described hereinabove wherein a mapping method or the like is used for learning.

[Process for Re-Setting a Sub Cluster]

Since a cluster and sub clusters are learned as described above, a graph wherein sub clusters are distributed, for example, as seen in FIG. 14 can be produced. While the number of items which belong to each individual sub cluster is not indicated in the example of the distribution of sub clusters shown in FIG. 14, the number of items which belong to a sub cluster differs among different sub clusters.

Since the number of items which belong to a sub cluster differs among different sub clusters, there is the possibility that a great difference in the number of items included in a sub cluster may appear such that, for example, the sub cluster 1 includes 100 items while the sub cluster 2 includes five items. There is the possibility that a sub cluster which includes only a smaller number of items when compared with the other sub clusters may not be suitable for independent setting as a sub cluster. In other words, the sub cluster may possibly be included in a different sub cluster or may be included in the different sub cluster for more suitable cluster setting.

Further, although there is an advantage that, as the number of sub clusters increase, more particular classification is achieved, there is the possibility that an unsuitably classified sub cluster may be included and besides there is the possibility that, where a great number of sub clusters are involved in a process when items are recommended to a user as hereinafter described, adequate recommendation cannot be assured. For example, since the classification is so particular that the user side cannot readily recognize differences among different sub clusters, even if a user desires to have items of a different sub cluster recommended and items of the different sub cluster are introduced to the user, only similar items may be recommended to the user.

In other words, as the number of sub clusters increases, characteristics of each sub cluster become less significant and the significance in setting of sub clusters and classification of items decreases.

In particular, it is considered that the number of sub clusters preferably is a suitable number with which suitable processing can be performed when sub clusters are applied to a new item or when items are recommended to a user as hereinafter described and preferably is a number with which characteristics of individual sub clusters appear significantly. Therefore, a process for adjusting the number of sub clusters produced by such a process as described hereinabove to an adequate number is performed. This process is described below.

Figure 17:
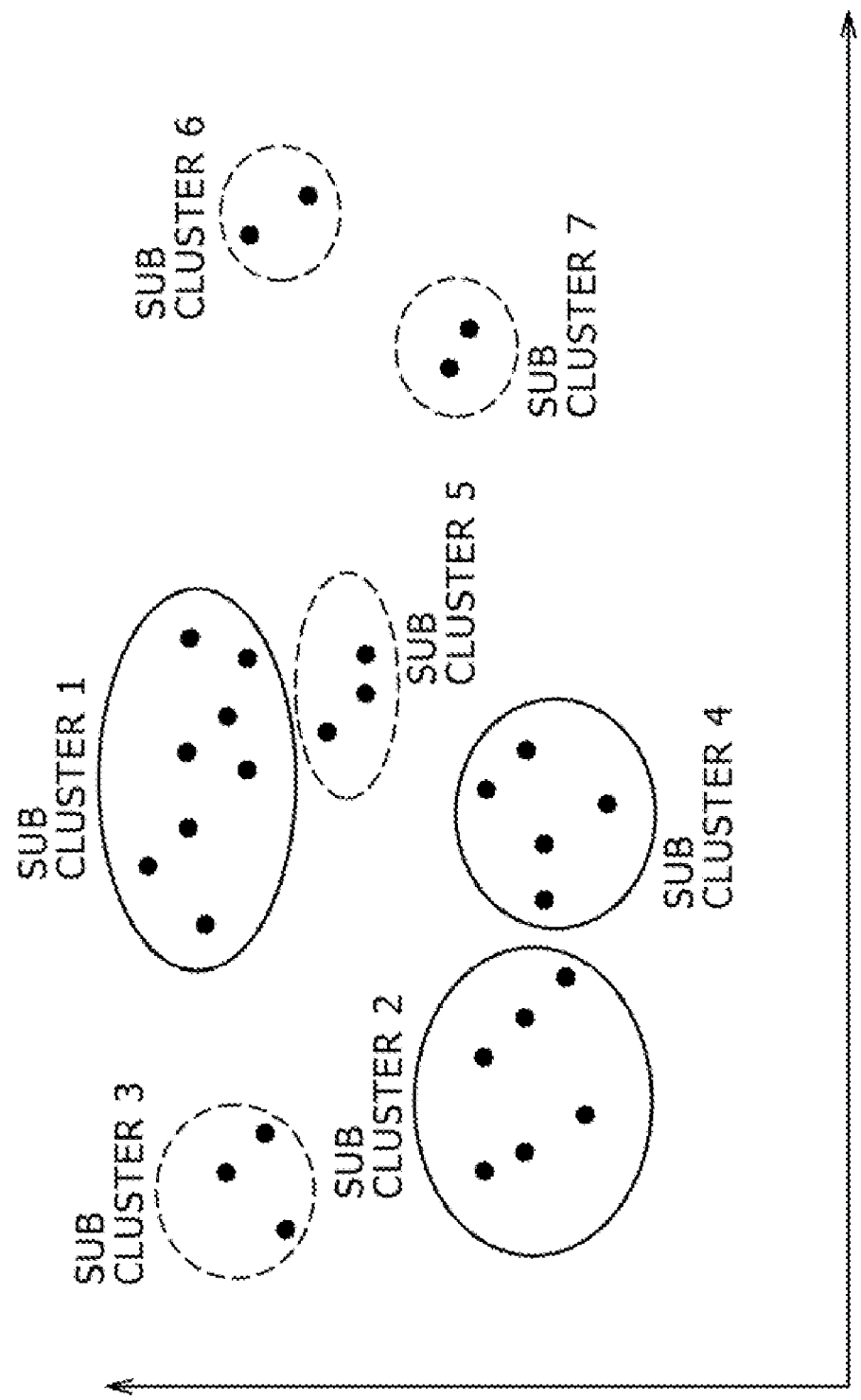
FIG. 17 is a view illustrating a distribution of sub clusters.

FIG. 17 is a view illustrating a distribution of sub clusters and the number of items included in the sub clusters when a plurality of items are classified into a plurality of sub clusters as a result of execution of such a sub cluster production process as described above similarly to FIG. 14. The example illustrated in FIG. 17 is an example wherein seven sub clusters including sub clusters 1 to 7 are produced.

The sub cluster 1 includes eight items; the sub cluster 2 includes six items; the sub cluster 3 includes three items; the sub cluster 4 includes five items; the sub cluster 5 includes three items; the sub cluster 6 includes two items; and the sub cluster 7 includes two items.

Here, the sub clusters 3, 5, 6 and 7 (sub clusters indicated by a broken line n FIG. 17) include a smaller number of items than the other sub clusters (sub clusters indicated by a solid line in FIG. 17), for example, than the sub cluster 1. Such sub clusters which include a smaller number of items as mentioned above are merged into a different sub cluster or deleted to edit the number of sub clusters to an adequate number. In particular, the sub clusters 3, 5, 6 and 7 here are either merged into one of the sub clusters 1, 2 and 4 or deleted.

In order to decide whether a sub cluster should be merged into another sub cluster or deleted because the number of items included therein is small, the concept of approval rating is introduced here such that, if the approval rating is high, then the sub cluster is not merged, but if the approval rating is low, the sub cluster is merged.

Further, in the present embodiment, when a sub cluster is merged into another sub cluster because the number of items included therein is small, it is merged such that the characteristics of the sub clusters to be merged are similar to each other. In order to make the characteristics of the sub clusters, which are to be merged with each other, similar to each other, the concept of distance between sub clusters is introduced such that a sub cluster is merged into another sub cluster whose distance from the sub cluster is small.

First, the approval rating is described. It is to be noted that the "approval rating" in the second sub cluster learning process described hereinabove with reference to FIG. 16 and the "approval rating" described below indicate different approval ratings (different numerical values) from each other.

FIG. 18 is a table for use for calculation of an approval rating obtained by rewriting the questionnaire management table 171 illustrated in FIG. 8 which indicates the statistics of users regarding predetermined pieces of music regarding a predetermined mode. Also the table illustrated in FIG. 18 is referred to as questionnaire management table 171' because it is produced based on questionnaire results from users.

In the questionnaire management table 171' shown in FIG. 18, the axis of ordinate indicates the user name and the axis of abscissa indicates the item (in this instance, music), and indicates a result of decision by the users regarding whether or not a predetermined piece of music conforms to the mode of "sad". For example, as regards the music 1, the user A decides it as sad music (indicated by ○ in FIG. 18); the user B decides it not as sad music (indicated by x in FIG. 18); the user C decides it as sad music; the user D decides it as sad music; and the user E decides it as sad music. As a result, it is indicated that the total number of those users who decide the music 1 as sad music is "4" and the rating is "0.80" (=4/5).

In this manner, in the questionnaire management table 171', the total number and the rating of those users who decide, in a predetermined mode (in the example illustrated in FIG. 18, in the mode of "sad"), an item (music) of an object of processing as being coincident with the predetermined mode are managed.

The description continues taking a case wherein sub clusters are distributed and items (pieces of music) are included in such a manner as seen in FIG. 17 as a result of execution of a process of learning a sub cluster based on the data managed in such a questionnaire management table 171' as described above (data managed in the questionnaire management table 171 illustrated in FIG. 8) as an example.

As described hereinabove with reference to FIG. 17, the sub clusters 3, 5, 6 and 7 from among the sub clusters illustrated in FIG. 17 are determined as sub clusters which are to be merged into another sub cluster or to be deleted. The following description proceeds taking the sub cluster 3 and the sub cluster 6 among the sub clusters mentioned above as an example.

FIG. 19 is a view illustrating pieces of music included in the sub cluster 3 and pieces of music included in the sub cluster 6. The sub cluster 3 includes pieces 4, 5 and 6 of music and the sub cluster 6 includes pieces 1 and 2 of music. The rating of the pieces 4, 5 and 6 of music included in the sub cluster 3 is "0.20", "0.20" and "0.20", respectively. Meanwhile, the rating of the pieces 1 and 2 of music included in the sub cluster 6 is "0.80" and "1.00", respectively.

The approval rating is calculated using the ratios of the pieces of music included in the sub clusters. Here, the approval rating is calculated based on the following expression (1) using the data relating to the rating of the predetermined music.

$$\text{Approval rating} = \Sigma(N_i/i) \quad (1)$$

In the expression (1) above, "i" represents the member number of sub clusters, and $N_i$ represents the coincident evaluation numbers of an item. The "member number of sub clusters" is the number of users who evaluate a predetermined item, and, for example, in FIG. 18, is 5 including the users A to E. Meanwhile, the "coincident evaluation number of an item" is the number of users who answer that a predetermined mode coincides with a predetermined item. For example, in FIG. 18, since the number of users who answer that the mode of "sad" coincides with the "music 1" is 4, the coincident valuation number of an item is 4.

Therefore, since ($N_i/i$) is a result of division of the coincident evaluation number by the number of users, it is a "ratio". Since, for example, in FIG. 18, "$N_i$" of the "music 1" is 4 and "i" is 5, ($N_i/i$) is calculated as "0.8". In other words, this "0.8" is a ratio. Therefore, the expression (1) is an expression for calculating the sum total of ratios.

The expression (1) is for determining the sum total of ratios of items included in a sub cluster of an object of processing, and a result of the calculation is the approval rating.

Here, the approval ratings of the sub cluster 3 and the sub cluster 6 are determined based on the expression (1). The items (in this instance, pieces of music) included in the sub cluster 3 and the sub cluster 6 and the ratios of the items are such as illustrated in FIG. 19.

Approval rating of sub cluster
3=0.20+0.20+0.20=0.60

Approval rating of sub cluster 6=0.80+1.00=1.80

In this manner, while the number of items included in the sub cluster 3 is greater than the number of items included in the sub cluster 6, the approval rating of the sub cluster 3 is lower than the approval rating of the sub closer 6.

Since the sub cluster 3 and the sub cluster 6 include items whose number is smaller than a predetermined number as described hereinabove, they are sub clusters which are decided as an object of deletion or merging with another cluster. As a condition for determining whether or not a sub cluster which is an object of deletion or merging should be deleted, a condition that, where the approval rating of the object sub cluster is lower than a predetermined value, the sub cluster should be deleted, but where the approval rating is equal to or higher than the predetermined value, the sub cluster should be merged into another sub cluster is applied here.

Figure 20:
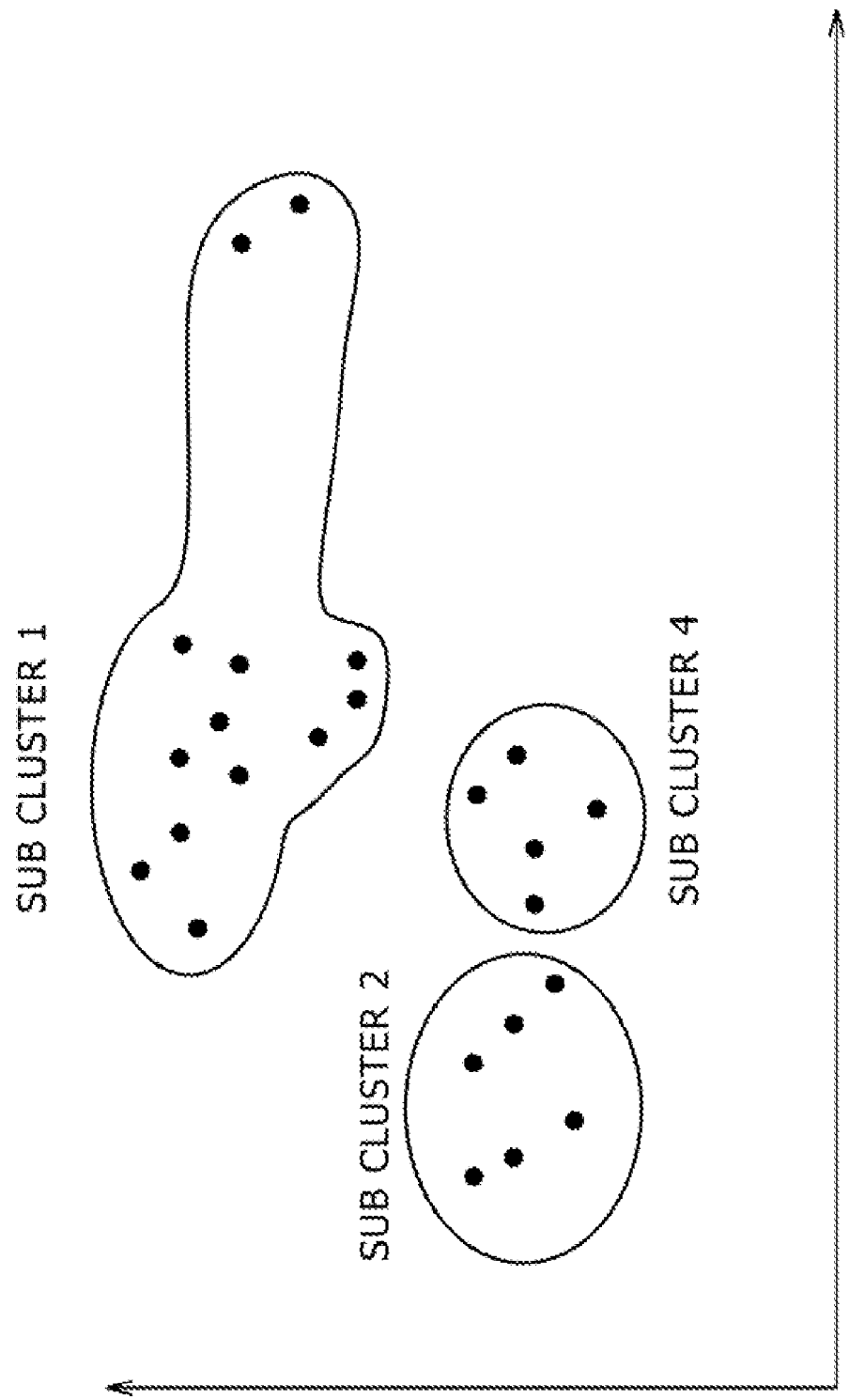
FIG. 20 is a view illustrating a re-edited distribution of sub clusters.

Where, for example, "1.00" is set as the predetermined value, the sub cluster 3 whose approval rating is "0.60" is deleted whereas the sub cluster 6 whose approval rating is "1.80" is not deleted but merged into another sub cluster.

Where deletion and merging of sub clusters are performed under such setting as described above, the sub cluster 3 and the sub cluster 7 from among the sub clusters 3, 5, 6 and 7 which are an object of deletion or merging are determined as an object of deletion because the approval rating is lower than the predetermined value while the sub cluster 5 and the sub cluster 6 are determined as an object of merging because the approval rating is equal to or higher than the predetermined value. In such an instance, as a result after such deletion and merging are performed, such a distribution of sub clusters as shown in FIG. 20 is obtained. In other words, the distribution of sub clusters illustrated in FIG. 17 is re-edited into such a distribution of sub clusters as seen in FIG. 20.

In the distribution of sub clusters illustrated in FIG. 20, since the sub cluster 5 and the sub cluster 6 are merged in the sub cluster 1, none of the sub cluster 5 and the sub cluster 6 exists. Further, since the sub cluster 3 and the sub cluster 7 are deleted, they do not exist on the distribution of sub clusters illustrated in FIG. 20.

Since the sub cluster 5 and the sub cluster 6 are merged in the sub cluster 1, the number of items in the sub cluster 1 exhibits increase from 8 to 13.

Further, after the deletion and merging of sub clusters are performed, three sub clusters including the sub cluster 1, sub cluster 2 and sub cluster 4 remain as seen in FIG. 20. After this state is established, the sub cluster may be re-named to sub cluster 3 (in the following description, such a number as "3" in the sub cluster 3 or the like is referred to as sub cluster number). In particular, the sub cluster numbers may be re-edited so that they may include no blank number therein.

A functional block diagram of the clustering section 76 (FIG. 4 or 5) of the cluster learning section 52 when such a process as described above is executed is shown in FIG. 21. It is to be noted that the functions shown in FIG. 21 may be included in the clustering section 76 (the following description proceeds in this condition) or may be executed by some other element to which a result is supplied from the clustering section 76 (for example, a configuration which additionally includes an element which executes a process which receives supply of a result from the clustering section 76 of FIG. 4).

Figure 21:
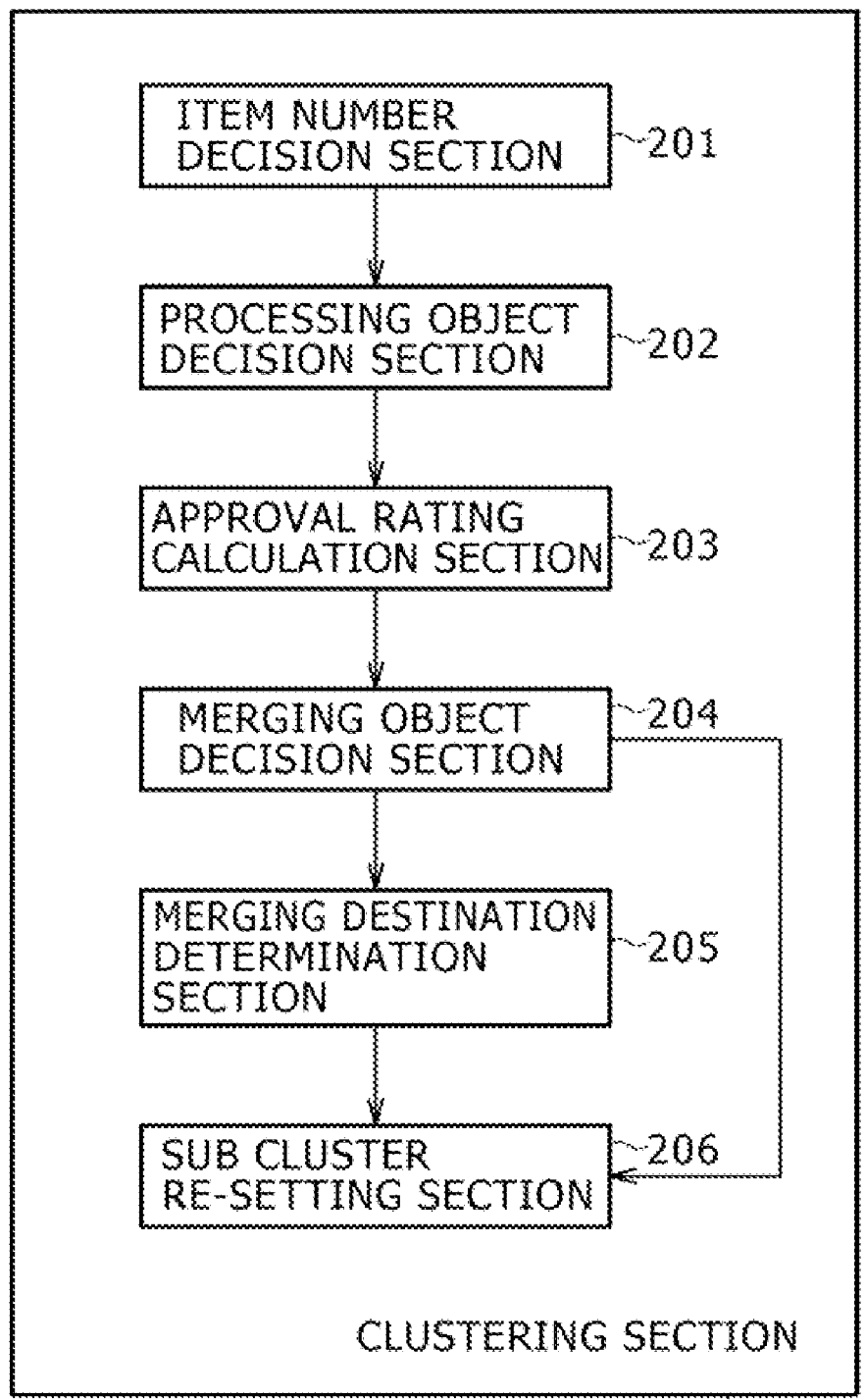
FIG. 21 is a functional block diagram of a cluster rig 76 which participates in re-editing of sub clusters.

The clustering section 76 shown in FIG. 21 includes an item number decision section 201, a processing object decision section 202, an approval rating calculation section 203, a merging object decision section 204, a merging destination determination section 205 and a sub cluster re-setting section 206.

The item number decision section 201 has a function of deciding the number of items included in a sub cluster of a processing object using a result of determination of the sub cluster in such a manner as seen in FIG. 17, for example, as a result of execution of the process of the flow chart illustrated in FIG. 11. For example, when the sub cluster 3 of FIG. 17 is determined as a processing object, the item number decision section 201 decides that the number of items included in the sub cluster 3 is 3.

The processing object decision section 202 compares the number of items decided by the item number decision section 201 with a predetermined value (threshold value). Then, if the item number is lower than the threshold value, then the processing object decision section 202 decides that the sub cluster is a sub cluster to make an object for which a processing for deletion or merging is to be performed, and sets the sub cluster as a sub cluster for which a process at a next process should be executed. However, if the item number is equal to or higher than the threshold value, then the processing object decision section 202 sets the sub cluster as a sub cluster which should remain as it is.

The approval rating calculation section 203 calculates the approval rating of the sub cluster of the processing object in such a manner as described above. For example, if the sub cluster of the processing object is the sub cluster 3 illustrated in FIG. 19, then the approval rating calculation section 203 calculates the approval rating as 0.80.

The merging object decision section 204 compares the approval rating calculated by the approval rating calculation section 203 with a predetermined value set in advance to decide whether the sub cluster of the processing object should be deleted or merged into another sub cluster.

The merging destination determination section 205 determines into which sub cluster the sub cluster determined as an object of merging by the merging object decision section 204 should be merged. The merging destination determination section 205 decides a sub cluster whose centroid distance to the sub cluster to be merged is smallest, and determines the sub cluster of the shortest distance as the sub cluster of the destination of merging.

The sub cluster re-setting section 206 deletes the sub cluster decided as a deletion object by the merging object decision section 204 from the distribution of sub clusters produced already but merges the sub cluster whose merging destination is determined by the merging destination determination section 205 into the sub cluster determined as a merging object thereby to re-edit the sub clusters produced once.

Figure 22:
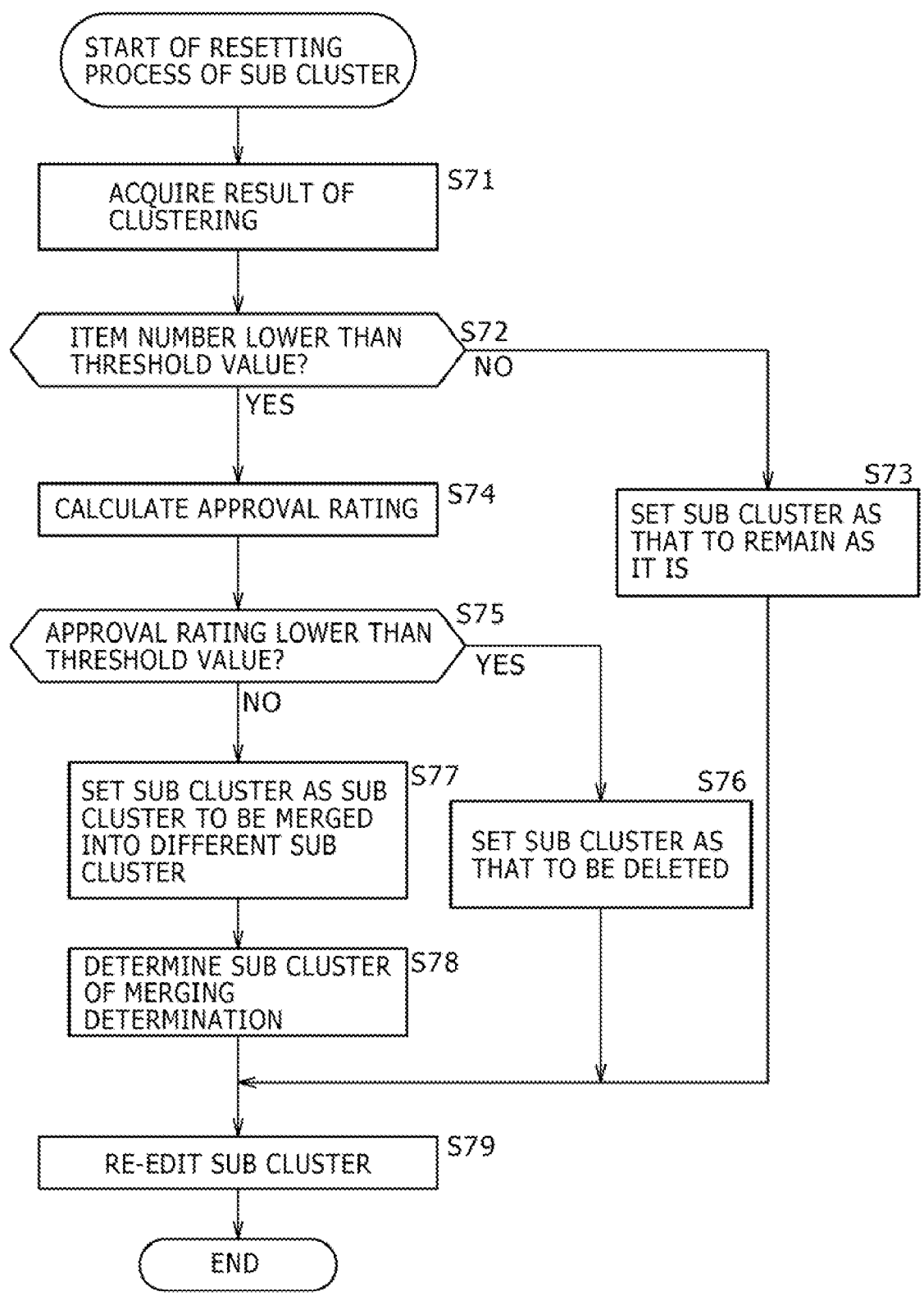
FIG. 22 is a flow chart illustrating a re-setting process of a sub cluster.

Operation of the clustering section 76 having such functions as described above is described with reference to a flow chart of FIG. 22.

At step S71, the item number decision section 201 acquires a result of clustering. In particular, the process at step S71 is performed in a state wherein clustering is performed already and a plurality of sub clusters are set, for example, as seen in FIG. 17, and information of the set sub clusters is acquired.

Then, the item number decision section 201 refers to the acquired result of clustering to determine a predetermined sub cluster as a processing object and decides the number of items included in the sub cluster. Then, the item number decision section 201 supplies a result of the decision to the processing object decision section 202.

At step S72, the processing object decision section 202 decides whether or not the number of items supplied from the item number decision section 201 is lower than a predetermined threshold value to decide whether or not the sub cluster which is set as the processing object at the point of time should be set as a sub cluster of an object for which a deletion or merging process should be executed.

If it is decided at step S72 that the number of items included in the sub cluster of the processing object is equal to or higher than the predetermined threshold value, the processing is advanced to step S73, at which the sub cluster is set as a cluster to remain as it is. For example, if the sub cluster 1 from among the results of clustering illustrated in FIG. 17 is determined as a processing object and the predetermined threshold value is 3 as described hereinabove, since the number of items included in the sub cluster 1 is 8, it is decided that this is higher than the threshold value and the sub cluster 1 is set as a sub cluster to remain as it is.

On the other hand, if it is decided at step S72 that the number of items included in the sub cluster of the processing object is lower then the predetermined threshold value, then the processing advances to step S74, at which the approval rating is calculated. If it is decided by the processing object decision section 202 that the number of items is lower than the predetermined threshold value, this signifies that the sub cluster is set as a sub cluster of an object for which a deletion or merging process should be performed, and information of the sub cluster is supplied to the approval rating calculation section 203, by which the approval rating is calculated.

As a method of calculation of the approval rating, the sum total of ratios of Items included in the sub cluster is calculated as described hereinabove, for example, with reference to FIGS. 18 and 19. The approval rating calculated by the approval rating calculation section 203 is supplied to the merging object decision section 204.

At step S75, the merging object decision section 204 compares the approval rating with a predetermined threshold value to decide whether or not the approval ratio is lower than the threshold value. If it is decided at step S75 that the approval rating is lower than the threshold value, then the sub cluster of the processing object is set as a sub cluster of a deletion object. On the other hand, if it is decided at step S75 that the approval rating is equal to or higher than the threshold value, the processing is advanced to step S77, at which the sub cluster of the processing object is set as a sub cluster of a merging object.

If it is set at step S77 that the sub cluster of the processing object should be merged into another sub cluster, then a sub cluster of the merging destination is determined at step S78. The sub cluster of the merging object is a sub cluster whose distance from the centroid of the sub cluster of the processing object is smallest and which is a sub cluster which is not determined as a deletion object or a merging object (which is set as a sub cluster decided to remain as it is at step S73). Information of the sub cluster of the determined merging object and information of the merging side sub cluster are supplied to the sub cluster re-setting section 206.

For example, if it is set that the sub cluster 6 in the distribution of sub clusters illustrated in FIG. 17 is to be merged into another sub cluster, the sub cluster 1 whose centroid distance to the sub cluster 6 is smallest is determined as a sub cluster of a merging destination. Then, information of the sub cluster 6 is supplied as information of the sub cluster to be merged to the sub cluster re-setting section 206, and information of the sub cluster 1 is supplied as information of the sub cluster of the merging destination to the sub cluster re-setting section 206.

At step S79, the sub cluster re-setting section 206 executes re-editing of the sub cluster such as deletion of the sub cluster of the deletion object or merging of the sub cluster of the merging object into the sub cluster of the merging destination. Thereupon, such a process of replacing a sub cluster number which is not in an allocated state any more as a result of deletion or merging with a sub cluster number of an existing sub cluster may be performed to perform editing of the sub cluster numbers.

For example, such a distribution of sub clusters as seen in FIG. 17 is edited into the distribution of sub clusters illustrated in FIG. 20 in this manner. Since the sub clusters are edited in this manner, a sub cluster which is not suitable as being set as a sub cluster can be excluded, and adequate setting of a sub cluster can be performed.

Although an adequate sub cluster can be set by performing such a process as described above, for example, if the number of sub clusters becomes exclusively small as a result of such setting, in an extreme case, if the number of sub clusters decreases to one, then the cluster=sub cluster is satisfied and the effect by provision of sub clusters deteriorates. In other words, if the number of sub clusters is small, there is the possibility that characteristics of individual sub clusters may become less significant. On the other hand, even if the number of sub clusters becomes great, the differences between sub clusters becomes small, and as a result, there is the possibility that characteristics of sub clusters may become less significant.

Therefore, a process may be performed so that the number of sub clusters becomes a number with which characteristics of sub clusters are definite and such a disadvantage that the process is complicated due to an excessively great number is less likely to occur, or in other words, a suitable number may be established.

In order to achieve a suitable number, for example, while the number of items included in a sub cluster is compared with a threshold value at step S72, the threshold value may be set as a variable value which is varied suitably so that the number of sub clusters may not become excessively small or excessively great as a result of editing. In other words, by setting the threshold value variable and adjusting the threshold value, the number of sub clusters to remain as they are can be adjusted.

Further, while it is decided at step S75 whether or not the approval rating is lower than the threshold value, the threshold value may be set as a variable value which is varied suitably so that the number of sub clusters may not become excessively small or excessively great as a result of editing. In other words, by setting the threshold value variable and adjusting the threshold value, the number of sub clusters to be deleted can be adjusted.

Further, the clustering method may be changed as described below. As the clustering method, the k-means method, hierarchy method and so forth are used as described hereinabove, and a plurality of clustering methods are available. Therefore, sub clusters may be determined for each of a plurality of clustering methods in advance, and a method which provides a suitable number of clusters (distribution) may be applied through comparison and investigation of results of the clustering methods.

Here, it is assumed that the result illustrated in FIG. 18 is used to perform clustering. Then, the following description proceeds under the assumption that, although sub clusters are determined once as a result of clustering, such deletion and merging of sub clustering as described above are performed thereafter and such a result as seen in FIG. 23 is obtained as a result of such deletion and merging.

FIG. 23 illustrates a result of such processes as deletion and merging performed after clustering is performed by methods including a method X, another method Y and a further method Z as a clustering method. In particular, in FIG. 23, the clustering methods, pieces of music 1 to 6 and sub clusters of the classification destination are associated with each other.

According to the table illustrated in FIG. 23, the music 1 and the music 2 are classified into the "sub cluster 1" by all of the method X, method Y and method Z. The music 3 is classified into the "sub cluster 2" by the method x and classified into the "sub cluster 1" by the method Y and the method Z. The music 4 is classified into the "sub cluster 3" by the method X and classified into the "sub cluster 2" by the method Y and the method Z. The music 5 is classified into the "sub cluster 3" by the method X and the method Y but classified into the "sub cluster 2" by the method Z. The music 6 is classified into the "sub cluster 3" by the method X and classified into the "sub cluster 2" by the method Y and the method Z.

Where the pieces of music 1 to 6 are clustered by the method X, method Y or method Z in this manner, there is the possibility that a piece of music may be classified into different sub clusters. Such results are used to decide which one of the clustering methods is suitable for the mode.

In order to determine which one of the clustering methods should be used, the approval rating is calculated for each method as seen in FIG. 24. The approval rating is a value obtained by dividing the sum total of ratios of a predetermined sub cluster included in a method of a calculation object by the number of sub clusters. For example, the approval rating of the sub cluster 1 according to the method X is calculated in the following manner.

If the pieces of music are clustered by the method X, then the music 1 and the music 2 are classified into the cluster 1 (refer to FIG. 23). The ratio of the music 1 and the music 2 is "0.80" and "1.00" (refer to FIG. 18), respectively. Therefore, the sum total of the ratios regarding the sub cluster 1 according to the method X is "1.80" (=0.80+1.00). Since this sum total is the sum total of the ratios of the two items of the music 1 and the music 2, by dividing the sum total by 2, the value of "0.90" is obtained. The approval rating is calculated in this manner.

If the approval rating of the sub cluster 2 according to the method X is calculated similarly, then the following result is obtained. In particular, when the method X is used for clustering, only the music 3 is classified into the sub cluster 2. Since the ratio of the music 3 is "0.60", the approval rating is calculated as 0.60/1=0.60.

Further, if the approval rating of the sub cluster 3 according to the method X is calculated similarly, then the following result is obtained. In particular, when the method X is used for clustering, the pieces of music 4, 5 and 6 are classified into the sub cluster 3, and the ratio of the music 4 is "0.20"; the ratio of the music 5 is "0.20" and the ratio of the music 6 is "0.20". Therefore, the approval rating is calculated as (0.20+0.20+0.20)/3=0.20.

When the approval rating is calculated for each method and for each sub cluster in this manner, such results as seen in FIG. 24 are obtained.

Incidentally, as a good clustering method, results thereof preferably exhibit a dispersion. Therefore, such results as seen in FIG. 24 are used to calculate the dispersion of the approval rating for each method, and that method which exhibits the highest value of the dispersion is set as an adequate method.

The dispersion of the approval rating is calculated in accordance with the following expression (2). The value of the dispersion in the expression (2) is represented by $\sigma^2$.

[Expression 1]

$$\sigma^2 = \frac{\sum_{i=1}^{n}(\bar{x} - x_i)^2}{n} \qquad (2)$$

In the expression (2), n represents the number of sub clusters obtained as a result when a predetermined method is used to execute clustering and editing of sub clusters is performed. For example, when the method X is used to execute clustering in FIG. 24, three sub clusters of the clusterings 1 to 3 are obtained as a result of the clustering. Therefore, the value of n becomes "3".

In the expression (2), the first term in the parentheses of the numerator represents an average value of the approval ratings by the predetermined method, and the second term represents the approval ratings. In particular, as the arithmetic operation in the parentheses is performed, it can be calculated by what amount the approval rating of a predetermined sub cluster according to a predetermined method is displaced from the average value of the approval rating according to the method. In the numerator of the expression (2), the sum total of the square of the value in the parentheses is calculated, and the sum total of such sum totals is calculated. As the sum total is divided by n, the value of the dispersion is determined.

For example, the average value of the approval rating according to the method X is calculated, by referring to FIG. 24, as (0.90+0.60+0.20)/3=0.566

Therefore, the value of the first term within the parentheses in the expression (2) is "0.57" (rounding off).

Then, the square of the difference of the approval rating from the average value is calculated. As the sum total of the square values is calculated, the value of the numerator of the expression (2) is calculated. In other words, where the method X is applied, the value of the numerator of the expression (2) is calculated in accordance with the following expression.

$(0.57-0.90)^2+(0.57-0.60)^2+(0.57-0.20)^2=0.247$

Since the denominator n is "3", by dividing the calculated value "0.247" by "3", the value of "0.082" can be obtained. This value is the value of the numerator of the method X.

As such calculation is performed similarly for the method Y and the method Z, the value of the numerator according to the method Y is determined as "0.080" and the value of the numerator according to the method Z is determined as "0.116". By summarizing the above, the following is obtained.

| Method X | 0.082 |
| Method Y | 0.080 |
| Method Z | 0.116 |

The highest value among the values is the value of the numerator of the method Z. Therefore, in this instance, the method Z is determined as a method suitable as the clustering method and is applied as the clustering method.

One method which is decided to be most suitable can be selected and set from among a plurality of clustering methods. As a clustering method itself is selected in this manner, sub clusters can be set with a higher degree of adequateness. Further, by utilizing a result of clustering performed using an adequate clustering method, a process of a higher degree of adequateness, for example, a process for recommendation of items hereinafter described, can be performed.

[Process Relating to Application of a Cluster (Sub Cluster)]

After learning of a cluster is performed in this manner, a process for allocating a cluster or sub clusters (in the description given below, unless otherwise specified, the term cluster includes a sub cluster) to metadata to be added newly (metadata into which information of a cluster or sub clusters is not performed as yet) is executed. Such a process as just described is performed by the cluster application learning section 53 (FIG. 6) of the learning section 51. The process relating to cluster application is described with reference to a flow chart of FIG. 25.

At step S81, the metadata acquisition section 111 (FIG. 6) acquires metadata to which a cluster is applied. Metadata to which a cluster is applied is stored into the database 54 (FIG. 3) at a point of time when the process by the cluster learning section 52 (or the cluster learning section 52') is completed. In other words, metadata to which a cluster is applied and metadata to which no cluster is applied exist in the database 54.

At step S81, metadata to which a cluster is applied are acquired. At step S82, characteristic amounts are extracted from the acquired metadata. The metadata are stored in the database 54 in a state wherein the information relating to the items other than the item of cluster (in the following description, such information is referred to suitably as existing information) is described therein as described hereinabove.

For example, those metadata to which the cluster 1 is applied are extracted, and the existing information is read out from the extracted metadata. A cluster is a result of classification performed based on the mood (feeling of a user) or the like as described hereinabove. Since the cluster is based on the feeling of a user or the like, each cluster has a characteristic. In particular, in this instance, it is considered that a fixed characteristic exists in a piece of music (item which belongs to a predetermined cluster (for example, the cluster 1). It is to be noted that, in this instance, also a sub cluster may be taken into consideration to determine a piece of music which belongs to the same sub cluster of the same cluster as a processing object.

Therefore, at step S82, metadata of pieces of music which belong to a predetermined cluster are extracted, and existing information is read out from the extracted metadata. Then, the read out existing information is used to calculate the characteristic amounts of the pieces of music which belong to the cluster. The characteristic amounts of the cluster thus calculated are stored into the database 54.

At step S83, the item metadata acquisition section 114 reads out, from among the metadata stored in the database 54, those metadata to which a cluster is not applied (in which information of a cluster is not described). The read out metadata are supplied to the inappropriateness filter 113. The inappropriateness filter 113 is a filter produced by execution of the cluster learning process described hereinabove.

The inappropriateness filter 113 reads out data of an inappropriateness filter produced for a mood which is a processing object at the point of time (that is, a cluster (which does not include a sub cluster) which is a processing object) from the database 54. Then, the inappropriateness filter 113 decides whether or not the data coincide with the data from the item metadata acquisition section 114 thereby to perform filtering.

In other words, it is decided whether or not an item from the item metadata acquisition section 114 is appropriate to the predetermined mood.

At step S85, it is decided whether or not the item from the item metadata acquisition section 114 as a result of the filtering process executed at step S84 is an item (metadata of the item) which becomes an object to which sub clusters are to be applied. If it is decided that the item is not metadata to which sub clusters are to be applied, or in other words, if it is decided that the item is not an item appropriate to the mood of the processing object, then since there is no necessity to perform processes at steps beginning with step S85, the sub cluster application process for the item is ended.

On the other hand, if it is decided at step S85 that the item is metadata to which sub clusters are to be applied, then the processing advances to step S86. In this instance, at a point of time when it is decided that the item is determined to be appropriate to the predetermined mood, the cluster is determined as the cluster allocated to the predetermined mood. Therefore, since the cluster is determined, a process for determining sub cluster is performed as a succeeding process.

Although it is described that, at a point of time when it is decided that the item is determined to be appropriate to the predetermined mood, the cluster is determined as the cluster allocated to the predetermined mood, in order to perform such a process as just described, for example, such a mood-cluster conversion table 191 as illustrated in FIG. 26 is referred to. The mood-cluster conversion table 191 is held in the cluster determination section 115 (FIG. 6).

As seen in FIG. 26, the mood-cluster conversion table 191 is a table in which information wherein one mood and one cluster are associated with each other is described. Also other information may be described (associated) in the mood-cluster conversion table 191.

For example, it is possible to further associate one mood and a word associated with the mood with each other. For example, such words as "funeral", "disappointment in love" and "evening" associated from such a mood (word) as "sad" may be described in association in the mood-cluster conversion table 191. Where the mood-cluster conversion table 191 is configured in this manner, when the user inputs "evening" as a keyword, the mood of "sad" associated with "evening" is set, and a cluster associated with the mood of "sad" is set.

It is to be noted that, while it is described here that one cluster is allocated to one mood, one cluster may otherwise be allocated to a plurality of moods. However, preferably the plurality of moods are similar moods to each other (for example, similar feelings such as sad, sorrowful and grief). Further, in the present embodiment, since sub clusters can be set, even if a plurality of similar moods are allocated to one cluster, they can be classified with sub clusters. Therefore, degradation of the accuracy which may be caused by allocation of a plurality of moods to one cluster does not occur.

Such a mood-cluster conversion table 191 is referred to set a cluster, and sub clusters are set by a process described below.

At step S86, the cluster determination section 115 decides sub clusters. The cluster determination section 115 reads out existing information of the metadata supplied from the item metadata acquisition section 114 and performs matching between the existing information and the characteristic amounts supplied from the characteristic analysis section 112 (or read out from the database 54) to decide to which sub cluster the metadata belong (for example, where the sub clusters of the sub clusters 1 to 5 are involved as seen in FIG. 14, to which one of the sub clusters 1 to 5 the metadata belong).

It is to be noted that, while it is described here that a sub cluster is determined by matching between the existing information and the characteristic amounts, what data should be calculated as characteristic amounts (that is, information to be calculated at step S82) is determined depending upon the manner of the sub cluster decision process executed at this step S86. Further, while it is described here that a sub cluster is decided by matching, a sub cluster may be determined by a different method.

For example, for a process when a sub cluster is decided, such a method which uses a determination tree, a method which uses a discriminant, a method which uses a similarity degree of a cluster to a centroid, a method which uses weighting when calculation of a similarity degree is performed with an approval rating, a method wherein characteristic amount metadata are categorized to perform similarity degree calculation and so forth can be used. In other words, any learning method may be used only if it can perform classification of inappropriate pieces of music or clusters.

Where such a technique which uses a determination tree or a technique which uses a discriminant as described above is used to decide a sub cluster, the determination tree or the discriminant uses numerical values produced by the execution of the process or the processing procedure used at step S81 or step S82.

In particular, for example, where an item is a piece of music, if metadata applied to a cluster (sub cluster) are analyzed, then it is analyzed in what numerical value range the tempo of pieces of music which belong to the sub cluster 1 of the cluster 1 is included, in what numerical value range the speed is included or the like, and a determination tree or a discriminant based on such analysis is produced. Then, a sub cluster decision process is executed based on the thus produced determination tree or discriminant.

After a sub cluster of metadata of the predetermined music (sub cluster of the item) is determined at step S86, the determined sub cluster is written into the metadata at step s87. It is to be noted that the cluster is determined already at a point of when the filtering by the inappropriateness filter 113 is performed as described hereinabove (determined at a point of time when the mood-cluster conversion table 191 is referred to), and the cluster is written into the metadata together with the sub cluster.

The metadata in which the cluster and the sub cluster are written is stored into the database 54. The metadata in which the cluster is written are, for example, such metadata 172 as illustrated in FIG. 9.

The metadata to which the cluster and the sub cluster are applied already are used to apply a cluster and a sub cluster to metadata to which no cluster is applied in this manner. The data to which the cluster and the sub cluster are applied in this manner may be handled as metadata to which a cluster is applied in the process at step S81. Or, only metadata which is a processing object in the flow chart of FIG. 11 or 15 (cluster learning process) may be acquired as metadata to which a cluster is applied at step S81.

It is to be noted that, where only metadata which is a processing object in the flow chart of FIG. 11 or 15 (cluster learning process) is acquired by the process at step S81, the process at step S81 or S82 may be performed only once. Characteristic amounts calculated once by the process at step S81 or S82 are stored into the database 54, and the stored characteristic amounts may be used to execute the processes at the steps beginning with step S83. In other words, the processes at steps S81 and S82 can be omitted after characteristic amounts are calculated once.

[Process Relating to Recommendation of Items]

Figure 27:
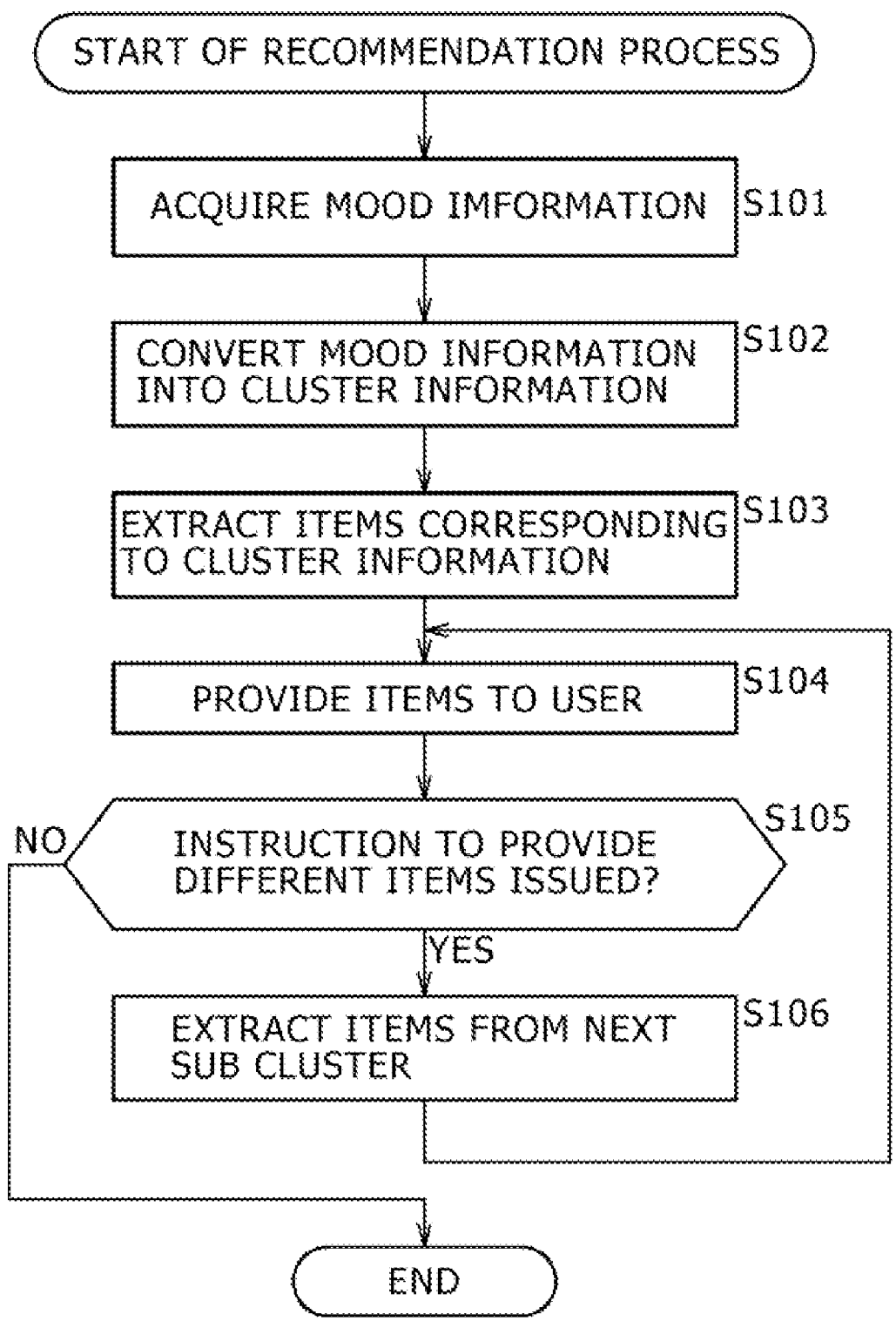
FIG. 27 is a flow chart illustrating a decision of a cluster.

Metadata to which a cluster is applied in this manner are used to execute a process when information suitable for a user is recommended to the user. The recommendation process is executed by the recommendation section 55 (FIG. 7). The recommendation process executed by the recommendation section 55 is described with reference to a flow chart in FIG. 27.

At step S101, the mood information acquisition section 141 acquires mood information. The mood information is provided from the user. For example, if the terminal 3 (FIG. 1) is operated and the user inputs a mood of the user itself (feeling, a state of mind or the like at the point of time of inputting) (for example, the user inputs text data such as "sad") and transmits the inputted data to the server 2, then the information is supplied to the mood information acquisition section 141 of the server 2.

At step S102, the mood-cluster conversion section 142 converts the mood information acquired by the mood information acquisition section 141 into information of a cluster. As described above, one cluster is allocated to one mood in a corresponding relationship with each other. For example, as described in the mood-cluster conversion table 191 of FIG. 26, the mood of "sad" is paired with "cluster 1" and the mood of "happy" is paired with "cluster 2". In this manner, a mood and a cluster are paired with each other.

In order to convert such mood information into cluster information, the mood-cluster conversion section 142 retains, for example, such a mood-cluster conversion table 191 as shown in FIG. 26. While it is described that the mood-cluster conversion table 191 is retained also by the cluster decision section 115 of the cluster application learning section 53 as described hereinabove, also it is possible for the mood-cluster conversion section 142 to refer to (share) the mood-cluster conversion table 191 retained by the cluster decision section 115.

The mood-cluster conversion section 142 refers to the mood-cluster conversion table 191 at step S102 to determined to which cluster the supplied mood information is appropriate. The determined cluster information is supplied to the recommendation information production section 143.

At step S103, the recommendation information production section 143 provides one of items belonging to the cluster indicated by the cluster information to the user side. The cluster information is written in the metadata 172 (FIG. 9) of the items. Those items in which a cluster coincident with the cluster information is written are read out from the database 54. There is the possibility that a plurality of items of the metadata in which the cluster which coincides with the cluster information is written may be stored in the database 54.

Where a plurality of items are stored in the database 54, for example, an item whose sub cluster is "1" (default value) is read out. While there is the possibility that also a plurality of items whose sub cluster is "1" may be stored in the database 54, where a plurality of items are stored, one of the items may be read out in accordance with a predetermined method (for example, in the ascending order of the item No.) or any one of the items may be read out at random.

Anyway, an item having metadata in which a cluster which coincides with the cluster information is written is read out and provided to the user.

At step S105, it is decided whether or not an instruction to provide a different item is issued. For example, the user can issue an instruction to provide a different piece of music considering that the item (piece of music) provided is not suitable for the mood (feeling) inputted by the user itself. It is decided at step S105 whether or not such an instruction as just described is issued. The decision just described can be performed by the mood information acquisition section 141.

If it is decided at step S105 that an instruction to provide a different item (piece of music) is not issued, then an item appropriate to the cluster and the sub cluster at the point of time is successively provided to the user side.

On the other hand, if it is decided at step S105 that an instruction to provide a different item is not issued, then the processing advances to step S106. At step S106, a sub cluster (different sub cluster) next to the sub cluster set at the point of time is re-set as a sub cluster to be provided, and items belonging to the re-set sub cluster are read out and provided to the user (the processing returns to step S104 and the processes at the steps beginning with step S104 are repetitively performed so that items are provided to the user).

At this time, while the sub cluster is re-set, the setting regarding the cluster is maintained as it is. In particular, while pieces of music belonging to the mood (belonging to the cluster) inputted by the user are successively provided to the user side, pieces of music whose feeling is different although they belong to the same mood (music whose sub cluster is different) are provided to the user.

This signifies that, while there is the possibility that the feeling may be differ depending upon the user even if the mood (state of mind, feeling or the like) is same, it is signified that an item absorbing such a difference as just described can be provided. In other words, if the present invention is applied, then provision of an item suitable for individual users can be achieved.

Incidentally, in the description of the embodiment above, it is described that the process regarding learning of a cluster and recommendation of items is performed on the server 2 side. Such a form that the process is performed on the server 2 side as described above is suitable, for example, for a case wherein items are provided through the network 1 or the like.

However, this does not signify that such processes regarding learning of a cluster and recommendation of items as described above are performed only on the server 2 side. For example, also it is possible for the server 2 side to perform the process regarding learning of a cluster and for the terminal 3 side to perform recommendation of items based on a result of the process on the server 2 side. Further, the processes regarding learning of a cluster and recommendation of items may be executed on the terminal 3 side.

Where the process of learning or recommendation is performed on the terminal 3 side, also it is possible, for example, to perform such processes that music data recorded on a CD (Compact Disk) purchased by the user or music data of a piece of music stored in a database (not shown) of the terminal 3 are analyzed to perform learning of a cluster and recommend pieces of music stored in the database of the terminal 3.

Also in a case wherein the series of processes from learning to recommendation is performed on the terminal 3 side, it can be performed by a process similar as in the case described above.

By applying the present invention, it can be learned what item an item suitable for a mood such as a feeling and a state of mind of the user is. Further, it can be classified using a result of the learning for what mood a newly added item is suitable. Further, an item suitable for a mood of the user can be recommended using a result of the classification. In the recommendation, an item suitable to each user can be recommended.

[Recording Medium]

While the series of processes described above can be executed by hardware, it may otherwise be executed by software. Where the series of processes is executed by software, a program which constructs the software is installed from a program storage medium into a computer incorporated in hardware for exclusive use or, for example, a personal computer for universal use which can execute various functions by installing various programs.

The program storage medium on or in which a program which is installed into a computer and placed into an executable state by the computer may be formed as a removable medium 31 which is a package medium such as, as shown in FIG. 2, a magnetic disk (including a floppy disk), an optical disk (including a CD-ROM (Compact Disc-Read Only Memory) and a DVD (Digital Versatile Disk)), a magneto-optical disk including an MD (Mini-Disc)), or a semiconductor memory, as a ROM 22 or a hard disk which forms a storage section 28 or the like. Storage of the program into the program storage medium is performed utilizing a wired or wireless communication medium such as a local area network, the Internet or a digital communications broadcast, as occasion demands, through a communication section 29 which is an interface such as a router or a modem.

It is to be noted that, in the present description, the steps which describe the program recorded in or on a program storage medium may be but need not necessarily be processed in a time series in the order as described, and include processes which are executed parallelly or individually without being processed in a time series.

Further, in the present description, the term "system" is used to represent an entire apparatus composed of a plurality of apparatus.

It is to be noted that the embodiment of the present invention is not limited to the embodiment described hereinabove but can be modified in various forms without departing from the spirit and scope of the present invention.

The invention claimed is:

1. An information processing apparatus, comprising:
    a computing processor configured to execute a program, the program including:
        an acquisition section configured to acquire information which indicates whether or not a predetermined item is appropriate to a predetermined mood;
        an extraction section configured to analyze the information acquired by said acquisition section to extract a characteristic amount of an item which is decided as not being appropriate to the predetermined mood;
        a first learning section configured to analyze the information acquired by said acquisition section to learn a cluster corresponding to the mood and a plurality of sub clusters corresponding to the cluster;
        a second learning section configured to learn a characteristic of each mood using the item to which the cluster and the sub clusters learned by said first learning section are applied;
        a decision section configured to decide whether or not a characteristic amount of an item to which a cluster is not applied coincides with the characteristic amount extracted by said extraction section; and
        an application section configured to apply a cluster and sub clusters to the item decided as not being coincident by said decision section based on the characteristic learned by said second learning section.

2. The information processing apparatus according to claim 1, wherein
    the information acquired by said acquisition section is information regarding a result of questionnaire performed for the user.

3. The information processing apparatus according to claim 1, wherein
    said first learning section performs multivariate analysis of the information acquired by said acquisition section to quantize the information into several-dimensional data, and performs clustering of the information quantized in the several-dimensional data to learn the sub clusters.

4. The information processing apparatus according to claim 1, wherein
    said first learning section performs multivariate analysis of a characteristic amount of the item which is not determined as an object from which the characteristic amount is to be extracted by said extraction section to quantize the characteristic amount into several-dimensional data, and performs clustering of the characteristic amount quantized in the several-dimensional data to learn the sub clusters.

5. The information processing apparatus according to claim 1, wherein
    said first learning section includes a re-editing section configured to re-edit the sub clusters, and
    said re-editing section deletes, where the number of items included in a predetermined sub cluster is less than a predetermined threshold value, the sub cluster.

6. The information processing apparatus according to claim 5, wherein, where the number of items included in the predetermined sub cluster is less than the predetermined threshold value and a value calculated based on a decided ratio of the number of items appropriate to the predetermined mood from among the items included in the predetermined sub cluster is equal to or greater than a predetermined threshold value, said re-editing section merges the predetermined sub cluster into a different sub cluster.

7. The information processing apparatus according to claim 1,
    wherein the program further comprises a selection section configured to select one method from among a plurality of clustering methods used when the sub cluster is learned by said first learning section;
    said selection section selecting a method which exhibits the most dispersed state of the sub clusters based on results where clustering is performed using the plural clustering methods.

8. The information processing apparatus according to claim 1,
    wherein the program further comprises:
        a conversion section configured to convert information regarding a mood indicated by the information into a cluster associated with the mood; and
        a recommendation section configured to recommend an item to which the cluster converted by said conversion section is allocated;
        said recommendation section recommending, where an instruction to recommend a second item other than a first item recommended by said recommendation section, the second item to which a sub cluster different from that of the first item is applied.

9. An information processing method, comprising:
    an acquisition step of acquiring information which indicates whether or not a predetermined item is appropriate to a predetermined mood;
    an extraction step of analyzing the information acquired by the process at the acquisition step to extract a characteristic amount of an item which is decided as not being appropriate to the predetermined mood;
    a first learning step of analyzing the information acquired by the process at the acquisition step to learn a cluster corresponding to the mood and a plurality of sub clusters corresponding to the cluster;
    a second learning step of learning a characteristic of each mood using the item to which the cluster and sub clusters learned by the process at the first learning step are applied;

a decision step of deciding whether or not a characteristic amount of an item to which a cluster is not applied coincides with the characteristic amount extracted by the process at the extraction step; and an application step of applying a cluster and sub clusters to the item decided as not being coincident by the process at the decision step based on the characteristic learned by the process at the second learning step.

10. A nontransitory computer-readable storage medium encoded with a computer program, which when executed by a computer, causes the computer to execute:

an acquisition step of acquiring information which indicates whether or not a predetermined item is appropriate to a predetermined mood;

an extraction step of analyzing the information acquired by the process at the acquisition step to extract a characteristic amount of an item which is decided as not being appropriate to the predetermined mood;

a first learning step of analyzing the information acquired by the process at the acquisition step to learn a cluster corresponding to the mood and a plurality of sub clusters corresponding to the cluster;

a second learning step of learning a characteristic of each mood using the item to which the cluster and sub clusters learned by the process at the first learning step are applied;

a decision step of deciding whether or not a characteristic amount of an item to which a cluster is not applied coincides with the characteristic amount extracted by the process at the extraction step; and an application step of applying a cluster and sub clusters to the item decided as not being coincident by the process at the decision step based on the characteristic learned by the process at the second learning step.

* * * * *